(12) United States Patent
Feibleman

(10) Patent No.: US 11,148,338 B2
(45) Date of Patent: *Oct. 19, 2021

(54) DEVICES, SYSTEMS, AND METHODS FOR EXTRUDING MATERIALS BEARING MILLEFIORI-LIKE PATTERNS

(71) Applicant: Dorothy Feibleman, Tokoname (JP)

(72) Inventor: Dorothy Feibleman, Tokoname (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/828,943

(22) Filed: Mar. 24, 2020

(65) Prior Publication Data
US 2020/0223119 A1  Jul. 16, 2020

Related U.S. Application Data

(63) Continuation-in-part of application No. 15/079,088, filed on Mar. 24, 2016, now Pat. No. 10,598,283.

(60) Provisional application No. 62/137,555, filed on Mar. 24, 2015.

(51) Int. Cl.
| | |
|---|---|
| *B29C 48/17* | (2019.01) |
| *B29C 48/07* | (2019.01) |
| *B29C 48/365* | (2019.01) |
| *B29C 48/21* | (2019.01) |
| *B29L 9/00* | (2006.01) |
| *B29L 7/00* | (2006.01) |

(52) U.S. Cl.
CPC .......... *B29C 48/175* (2019.02); *B29C 48/07* (2019.02); *B29C 48/21* (2019.02); *B29C 48/365* (2019.02); *B29L 2007/00* (2013.01); *B29L 2009/00* (2013.01)

(58) Field of Classification Search
CPC ..... B29C 48/175; B29C 48/365; B29C 48/07; F16J 9/12; B28B 3/24
USPC .......................................... 425/461
See application file for complete search history.

(56) References Cited

U.S. PATENT DOCUMENTS

| | | |
|---|---|---|
| 1,948,982 A | 7/1930 | Cutter |
| 3,318,202 A | 5/1967 | Means |
| 3,517,097 A | 6/1970 | Mixell et al. |
| 6,319,532 B1 | 11/2001 | Pineault |
| 7,811,074 B2 | 10/2010 | Schnee |
| 9,765,800 B2 | 9/2017 | Fukui |
| 2002/0022108 A1 | 2/2002 | Krantz et al. |
| 2013/0130026 A1 | 5/2013 | Heikkila et al. |
| 2016/0114518 A1 | 4/2016 | Zaleski, Jr. et al. |

OTHER PUBLICATIONS

"AMACO Brent Clay Extruder" (<https://www.sheffield-pottery.com/Amaco-Brent-Clay-Extruder-HD-p/abcehd.html>, Available 2015) (Year: 2015).

(Continued)

*Primary Examiner* — Matthew J Daniels
*Assistant Examiner* — Hana C Page
(74) *Attorney, Agent, or Firm* — Reichel Stohry Dean LLP; Natalie J. Dean; Mark C. Reichel

(57) ABSTRACT

One aspect of the present disclosure relates to devices for sealing gaps in an extrusion assembly to provide for a consistent extrusion. In one embodiment, a barrel-shaped sealing device with a resilient protruding edge is used to prevent extrusion material from entering gaps between the piston and the inner surface of the barrel. The sealing device includes a fastener to releasably attach the sealing device to the piston. Sealing rings are inserted into a bottom gap formed between the bottom edge of the barrel and the bottom surface of the die.

16 Claims, 16 Drawing Sheets

(56) References Cited

OTHER PUBLICATIONS

Dorothy Feibleman's Nerikomi Magic Part 2 <https://www.youtube.com/watch?v=j5ZZEDxHgw8> (Year: 2012).

Dorothy Feibleman's Nerikomi Work. <http://dorothyfeibleman.blogspot.com/2012/11/porcelain-nerikomi-and-nerikomi-magic.html> (Year: 2012).

"Glynnis Lessing." <http://www.glynnislessing.com/blog/?p=320> Available Aug. 16, 2009 (Year: 2009).

DEVICES, SYSTEMS, AND METHODS FOR EXTRUDING MATERIALS BEARING MILLEFIORI-LIKE PATTERNS

PRIORITY

The present application is related to, a U.S. continuation-in-part application, and claims priority benefit of U.S. patent application Ser. No. 15/079,088 to Feibleman filed Mar. 24, 2016 and which issues as U.S. Pat. No. 10,598,283 on Mar. 24, 2020, which is related to and claims the priority benefit of U.S. Provisional Patent Application Ser. No. 62/137,555, filed Mar. 24, 2015. The contents of the aforementioned applications and patent are hereby incorporated by reference in their entireties into this disclosure.

BACKGROUND

Extruders are useful tools for forming a variety of artwork and sculptures, including clay-based artwork and products. When operated correctly, an extruder should form an extruded product (i.e., an extrusion) with a substantially constant cross-section. However, due to variations in shape between separate pieces in a clay extruder, gaps can form that interrupt the consistency of the cross-section of an extrusion. Small gaps may exist between the barrel and the piston when the shape of the piston does not match exactly with the inner surface of the barrel extruder, thereby allowing clay to "leak-back" behind the piston during extrusion. Small gaps may also exist between the end of the barrel and an attached die. Clay may also exit through these gaps as the clay is being extruded, creating an inconsistent extrusion. Typically, when uniform clay is utilized, some degree of inconsistency can be tolerated; however, in more sophisticated arts, a uniform extrusion is essential as the material placed into the extruder is strategically constructed from many different types/colors of clay, and therefore conventional extruders are unacceptable for use in such techniques. Therefore, it is desirable to have a device that seals the various gaps that are present in the barrel of an extruder to produce as consistent a cross-section of material as possible for an extrusion. Accordingly, there remains a need for further contributions in this area of technology.

SUMMARY

The present disclosure includes certain embodiments, for operating in conjunction with an extrusion assembly that include a sealing device and/or one or more sealing rings for use in closing gaps which typically exist in the barrel of an extrusion assembly and extend the inner surface of the barrel all the way to the die.

One representative extrusion assembly is a barrel type extrusion assembly, such as those which are commonly mounted to a Wall for use in clay extrusion. The extrusion assembly includes a clutch system that may slide on a bar. A piston lever is attached to the extrusion assembly so that applying force upward or downward on the lever causes the clutch system and lever to slide along the bar. A piston assembly is connected to the piston lever so movement of the lever also causes the piston assembly to move. Alternately, a screw type piston or a powered piston may be utilized.

The extrusion assembly also includes a barrel with an opening in the top of the barrel into which extrudable material may be inserted. A base cap is attached to the bottom of the barrel. The base cap has an opening that accepts a die through which the extrudable material is pushed. The die has an opening designed to achieve the desired shape. The piston assembly may be inserted in the opening at the top of the barrel after the extrudable material and the die have been inserted. A user operates the extrusion assembly by pushing downward on the piston lever, so that the piston assembly slides downward through the barrel and pushes the extrudable material through the die mounted within the base cap.

Gaps may form in several areas of the barrel that affect the consistency of the extrusion when extrudable material is undesirably forced through these gaps. One of these gaps may exist between the inner surface of the barrel and the piston if the piston has a smaller diameter than the inner diameter of the barrel. Another gap may form between the bottom surface of the barrel and the bottom surface of the base cap.

In one form, a barrel seal with a resilient protruding edge may be inserted between the piston and the extrudable material. The protruding edge has a diameter equal to or just greater than the inner diameter of the barrel so that no gap exists between the barrel seal and the barrel. This protruding edge prevents extrudable material from entering a gap between the piston and the barrel.

Sealing rings may be inserted into the gap between the bottom surface of the barrel and the corresponding surface of the base cap. Multiple rings may be stacked on top of each other to fill the entire gap. The rings have roughly the same diameter as the barrel and are held in place by compression force between the barrel and the base cap.

In another embodiment, the barrel seal may be used after a completed extrusion cycle to clean the interior of the barrel by removing any remaining material after an extrusion cycle. The user removes the base cap from the barrel and clears the barrel of any loose extrudable material. The barrel seal is then inserted into the opening at the top of the barrel and the piston assembly is used to push the barrel seal through the length of the barrel. The protruding edge of the barrel scrapes the inner surface of the barrel and removes any excess extrudable material that is stuck on the barrel.

Further objects, features and advantages of the present disclosure will become apparent from the detailed drawings and descriptions provided herein. Each embodiment described is not intended to address every object described herein, and each embodiment does not include each feature described. Some or all of these features may be present in the corresponding independent or dependent claims, but should not be construed to be a limitation unless expressly recited in a particular claim.

Other embodiments of the present disclosure provide an extruder system comprising at least one extruder comprising a barrel having a barrel width structured to contain and pass an extrudable material, a piston assembly comprising a piston structured to fit at least partially within the barrel, and a body disposed within the barrel between the extrudable material and the piston. The piston assembly is configured to push the extrudable material through the barrel upon activation. Further, the body may comprise a first planar end and an opposing second planar end, with the first planar end being substantially parallel to the second planar end. The body may additionally comprise a lip extending radially from the body at or near the second planar end to define an edge, with the edge defining a first width and the lip comprising a resilient material. In such embodiments, the body supports the lip and enables the edge of the lip to flex. Further, the first width may be nearly the same as the barrel width, and the body may be releasably coupled with the piston such that the body is released from the piston when sufficient force is applied to the piston in a direction away from the body.

In certain embodiments of the extruder system, the at least one extruder may further comprise a fastener affixed to the first planar end at or near a centroid of the first planar end. The fastener may be structured to releasably attach the body to the piston and to release the body from the piston when the sufficient force is applied to the piston in the direction away from the body.

At least one of the extruders of the system may optionally comprise a cap. The cap may be structured to reversibly attach to an end of the barrel and to secure an extrusion die at the end. In at least one exemplary embodiment, the extruder may also comprise at least one spacer ring disposed between the end of the barrel and the cap. The at least one spacer ring may be configured to fill a gap formed between the end of the barrel and a bottom surface of the cap. In this manner, when downward pressure is applied to an extrudable material positioned within the barrel, a vortex is created within the extrudable material at or near the extrusion die. In certain embodiments comprising spacer ring(s), the at least one spacer ring includes opposing protrusions and grooves configured to engage one another such that multiple spacer rings are aligned when stacked one to another with the protrusion of one spacer ring engaging the groove of an adjacent spacer ring.

In at least one exemplary embodiment of the extruder system, the at least one extruder comprises a plurality of extruders. Furthermore, optionally, the piston assembly of each extruder may be activated through the application of compressed air (which may be applied across the extruders of the system in concert, series, independently or as otherwise desired). Alternatively, the piston of the piston assembly may be coupled with a lever and the piston assembly may be activated through application of force to the lever (which may be applied across the extruders of the system in concert, series, independently or as otherwise desired). It will be appreciated where force is applied to the system components in concert or series or other organized pattern, computers, processors and the like may be employed to drive this application as is known in the art.

Methods of extruding material are also provided. In at least one embodiment, a method of the present disclosure comprises: providing at least one extruder, each of the at least one extruders comprising: a barrel comprising a feed end, an extrusion end opposite the feed end, and a barrel width extending between the feed end and the extrusion end, the width structured to contain and pass an extrudable material, a piston assembly comprising a piston structured to fit at least partially within the barrel, the piston assembly configured to push the extrudable material through the barrel upon activation, a body disposed within the barrel between the extrudable material and the piston, wherein the body comprises a first planar end and an opposing second planar end, the first planar end being substantially parallel to the second planar end, and a lip extending radially from the body at or near the second planar end to define an edge, the edge defining a first width and the lip comprising a resilient material, and a die disposed at the extrusion end of the barrel. In this embodiment, the body may support the lip enabling the edge of the lip to flex, the first width may be nearly the same as the barrel width, and the body may be releasably coupled with the piston such that the body is released from the piston when sufficient force is applied to the piston in a direction away from the body. The method may further comprise the steps of placing material in a feed end of the barrel of the extruder; placing the body in the feed end of the barrel adjacent the material such that the body is behind the material relative to the extrusion end; applying a force to the first planar end of the body to extrude the material from the extrusion end of the barrel through the die; and creating a vortex within a core region of the material within the barrel.

In certain embodiments, the material may comprise at least a first layer and a second layer stacked together. The first layer may comprise at least a first material arranged in a first configuration and the second layer comprising at least a second material arranged in a second configuration. Certain embodiments of the presently disclosed methods may further comprise preparing the material as desired (e.g., in particular patterns and/or stacked layers). For example, and without limitation, the first layer may comprise a first clay having a first color and a second clay having a second color and/or comprise a first configuration comprising a starburst configuration or any other patterned configuration (e.g., a pattern achieved through extrusion, a hotdog configuration, a striped configuration, etc.).

Additionally or alternatively, the second layer may comprise the first clay and the second clay and the second configuration comprises the first clay layered over the second clay. Indeed, the material may comprise any design desired, including a plurality of first and second layers, each stacked together in a repeating pattern. Furthermore, one or both of the first clay and the second clay may comprise a unitary color (i.e. a consistent color throughout). Additional embodiments of the method may comprise the steps of cutting the extruded material into segments and firing the segments. Still further, additional method steps may comprise slicing the extruded material into segments and deairing and/or compressing the segments (this may occur in lieu of, before, or after firing as desired). Inventive tile products are also provided. In at least one embodiment, a novel tile having a pattern made by an extruder system of the present disclosure is provided, such pattern comprising at least two materials of different colors disposed in a stacked arrangement, wherein at least one of the at least two materials defines a central pattern on the tile. Such tile may comprise an extruded tile, an acoustic tile, and/or at least one of the at least two materials may comprise ceramic clay, translucent clay, or both. In at least one exemplary embodiment, the pattern overlays the pre-molded or extruded tile. In certain embodiments, the at least two materials may be molded materials disposed in a first stacked arrangement, subjected to a vortex created within an extrusion end of the extruder device, and extruded through a die in the extrusion end of the extruder device to result in a molded body. The resulting molded body may be optionally fired and/or comprise a millefiori pattern or another extruded imaging pattern achieved using sequencing of at least the first stacked arrangement.

DETAILED DESCRIPTION

Figure 1:
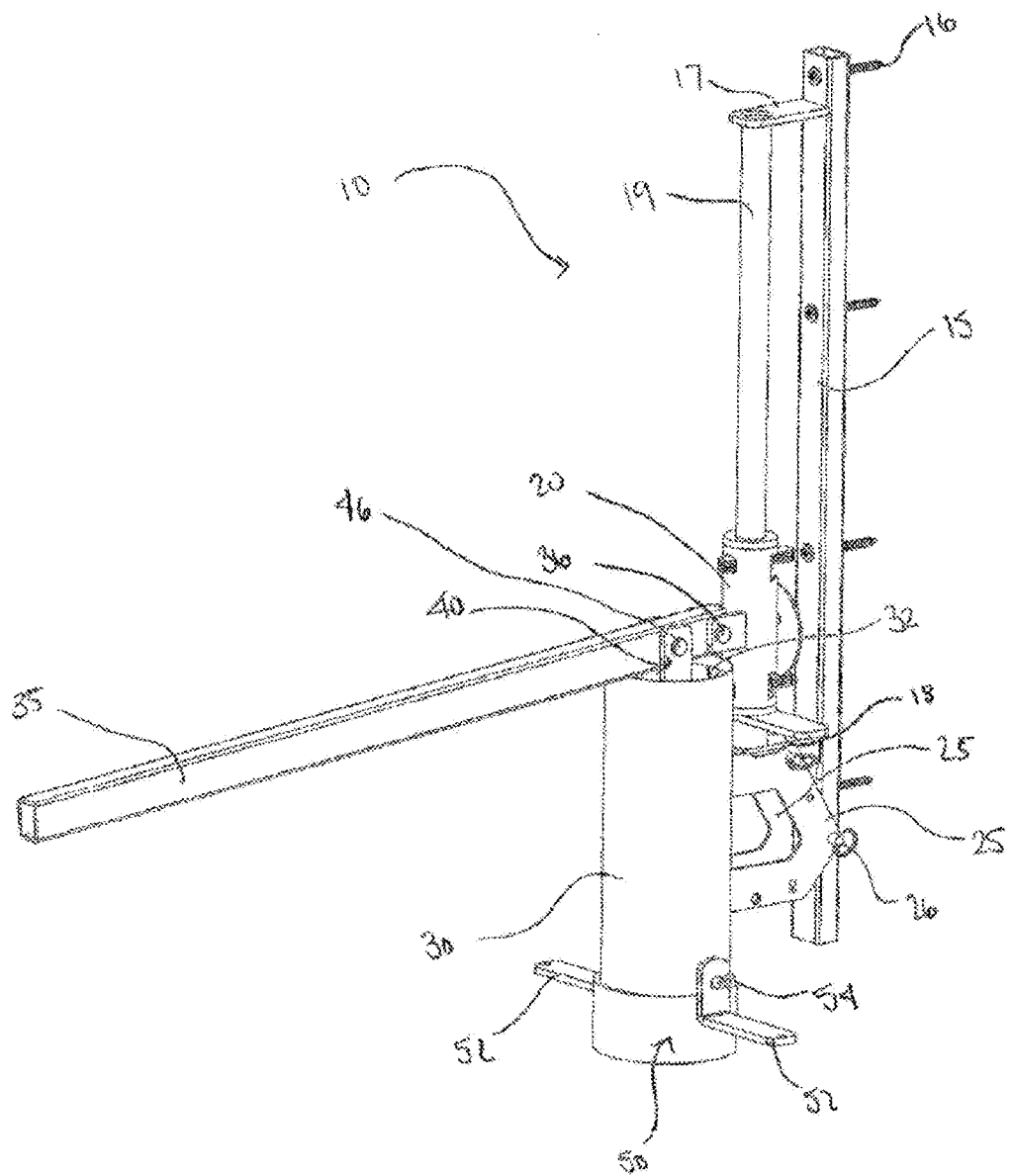
FIG. 1 is a perspective view of an extrusion assembly according to exemplary embodiments of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. Additionally, in the following description, like reference characters designate like or corresponding parts throughout the several views.

The term "about," as used herein, means approximately, in the region of, roughly or around. When the term "about" is used in conjunction with a numerical range, it modifies that range by extending the boundaries above and below the numerical values set forth. In general, the term "about" is used herein to modify a numerical value above and below the stated value by a variance of 10%. Therefore, about 50% means in the range of 45%-55%. Numerical ranges recited herein by endpoints include all numbers and fractions subsumed within that range (e.g., 1 to 5 includes 1, 1.5, 2, 2.75, 3, 3.90, 4, and 5). It is also t be understood that all numbers and fractions thereof are presumed to be modified by the term "about."

The present disclosure relates generally to devices for achieving a consistent extrusion using a conventional extrusion device and for sealing and cleaning the extruder device. The devices of the disclosure enable a consistent extrusion of material and include ring seals and a device for applying uniform pressure on the material and for removing excess material from the extruder after use.

One form of art for which the described devices are necessary for use with certain clay extruders is called Nerikomi. Nerikomi is a traditional Japanese technique for creating ceramic pottery with multiple colored clays. Historically, Nerikomi was performed by hand using slabs of different clays or clays colored with stains or oxides, are stacked, folded, pressed into logs. Slices of the log are then shaped into the desired piece, such as a vessel or plate. In this way, the numerous stacked layers appear as fine undulating lines embedded in a surrounding color in the finished article.

One variation of Nerikomi similarly utilizes slabs (or loads) of different clays or clays colored with stains or oxides, which are strategically stacked, folded, pressed into shape so as to achieve a desired pattern or result when the load is extruded through an extruded. The resulting extruded materials are then formed into the desired shape, such as by using a potter's wheel, or the like. In this variant of Nerikomi, a smooth and consistent extrusion is critical as any variations in the fluid dynamics of the clay will result in undesirable variations in the pattern of colors present in the extruded material. To achieve a consistent and predictable extrusion, any gaps between the components of the extruder that allow material to leak from the extruder must be eliminated. Nerikomi or clay which has structural images (such as millefiori) in the extrusion has not been accomplished before using ceramic clay and a conventional extruder to the knowledge of the inventor.

Figure 8A:
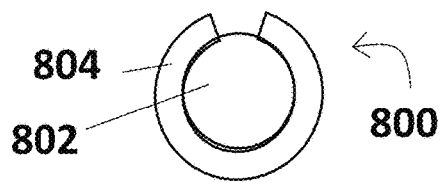
FIGS. 8A-8J show the conventional process of producing millefiori patterns in clay by hand.
Figure 8B:
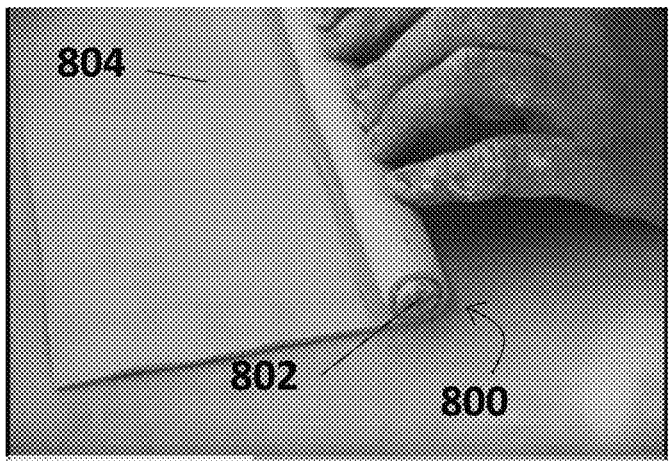
Figure 8C:
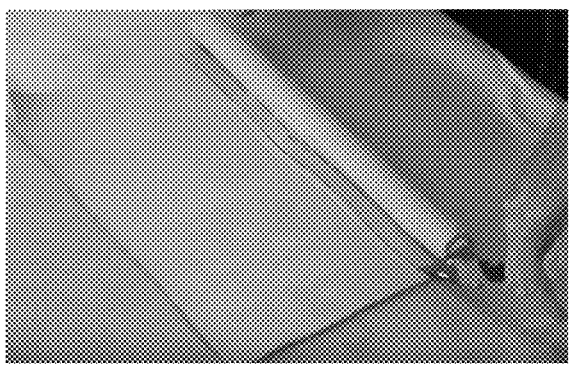
Figure 8D:
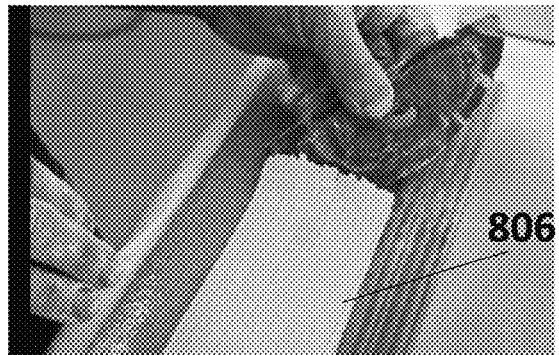
Figure 8E:
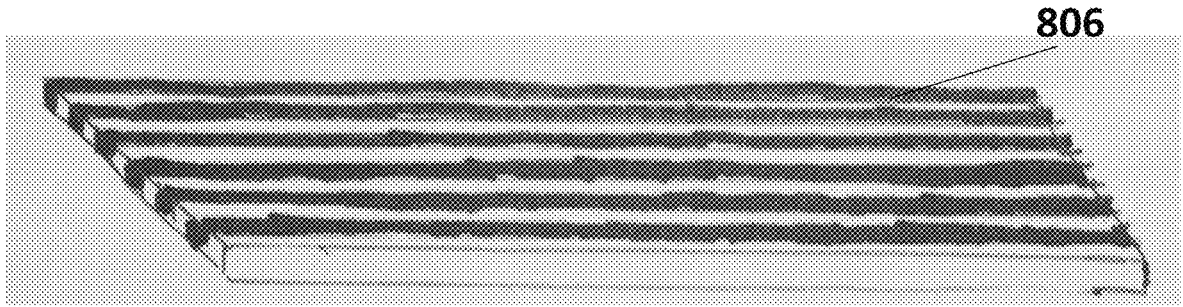
Figure 8F:
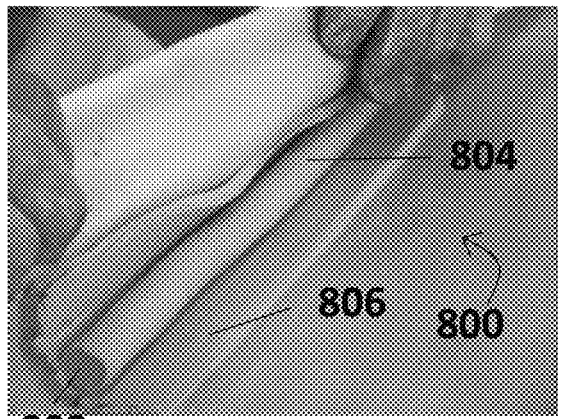
Figure 8G:
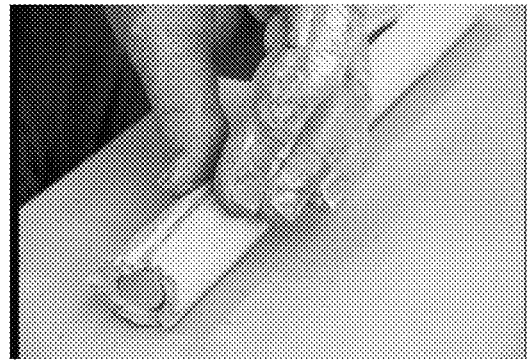
Figure 8H:
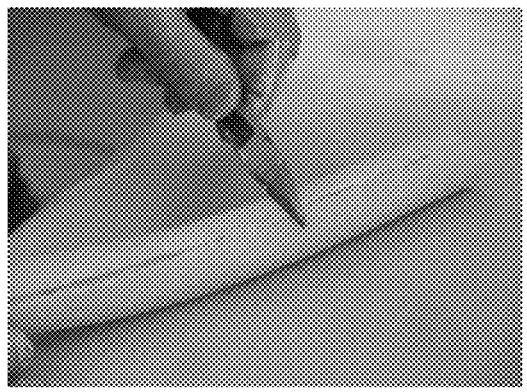
Figure 8I:
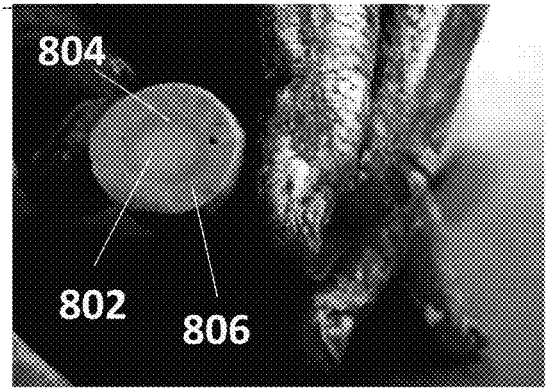
Figure 8J:
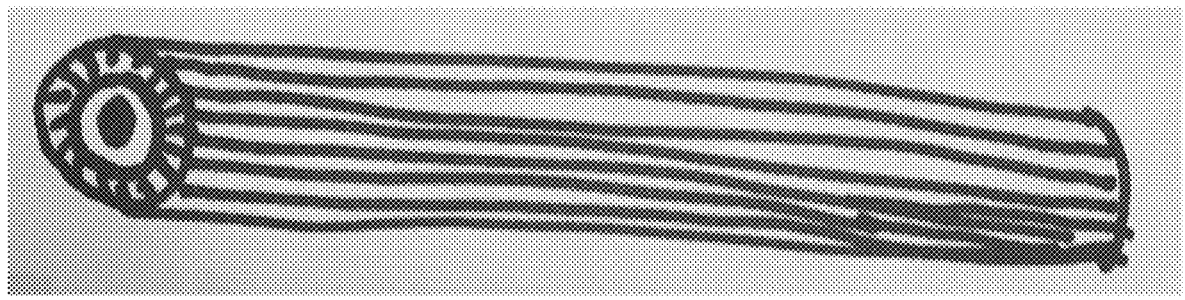

Now referring to FIGS. 8A-8J, the well-known steps of a conventional millefiori technique, which typically employs decorative bodies also called millefiori, are illustrated. The technique first requires the preparation of each decorative body individually and by hand (i.e. the millefiori being handmade from various-colored ceramic clays)—primarily, multiple clay pieces 802, 804 (usually comprising different colors) are prepared into a rod 800 as desired. For example, as shown in FIGS. 8B and 8C, a rod shaped first clay 802 is wrapped in a sheet of second clay 804 to create a pattern within the combined clays (see, e.g., the cross-section of the rod 800 in FIG. 8B). A third clay piece 806 (and, optionally, more additional clay pieces) may also be employed. As shown in FIGS. 8D and 8E, here the third clay piece 806 comprises two clay colors formed into a sheet. This third clay piece 806 is then wrapped around the outside of the previously formed clay pieces 802, 804 to further expand the diameter of the rod 800 (see FIGS. 8F and 8G). The rod 800 is then cut to display the pattern within the cross-section of the rod 800 (see FIGS. 8H-8J). In this manner, the multiple clay pieces 802, 804, 806 formed together by hand through this multiple step process effect a detailed pattern. The resulting rod 800 is then cut into thin slices, typically about 3 to 5 mm thick, which include multicolored spots/patterns in the cross-section (see FIGS. 8I and 8J), thus creating an impression of flowers or other complex motifs, which has given the aforementioned production method the name millefiori—a thousand flowers. If desired, thin slices can be aligned side by side to create a sheet, rolled to combine and/or flatten and affixed on a core surface, such as a bowl or the like. Optionally, the final product can be consistently processed, but the color pattern typically remains the same. In this manner, decorative items are obtained, which are decorated by handmade, multicolored, decorative millefiori, sealed in either a practically unchanged form on the surface.

The devices and methods of the present disclosure enable a user to achieve the desired consistent and predictable extrusion using a conventional extruder. Such extrusions can consistently display complex millefiori-like patterns in a clear, reproducible, and consistent matter. Furthermore, such techniques can be employed to create consistent and cost-effective tiles and other materials that comprise two or more materials designed to facilitate acoustic and/or light applications.

FIG. 1 shows an embodiment of a conventional extrusion assembly 10. Extrusion assembly 10 may include an extruder mount 15, a clutch system 20, barrel supports 25, a barrel 30, a piston lever 35, a piston system 40 and a base cap 50. The extrusion assembly 10 shown in FIG. 1 is merely an exemplary extruder. Alternative embodiments of extrusion assemblies may have different sizes, shapes, assemblies for mounting and different methods of moving the piston system within the barrel.

Extruder mount 15 attaches extrusion assembly 10 to a surface, such as a wall, with screws 16. A top bar support 17 and a bottom bar support 18 extend from extruder mount 15. A shaft 19 extends between top bar support 17 and bottom bar support 18. Barrel supports 25 are attached to and extend from a lower portion of extruder mount IS. Barrel supports 25 are connected by a pin 26 that is inserted through a hole in one barrel support 25 and extends through an opening in wall mount 25 and through a hole in the opposite barrel support 25.

A clutch system 20 is attached to shaft 19 so that the clutch system 20 may slide along the length of shaft 19. A piston lever 35 is attached to clutch system 20 and extends away from of extruder mount 15. Piston lever 35 is attached to clutch system 20 at a pin 36, allowing a user to slide clutch system 20 along shaft 19 by applying force upward or downward on piston lever 35. A piston system 40 is attached to piston lever 35 near pin 36 so that it moves with piston lever 35 when force is applied by the user. As shown in FIG. 1, when clutch system 20 is in its lowest position along shaft 19, piston system 40 is fully within barrel 30. Barrel 30 is connected to wall mount 15 by barrel supports 25. In at least one embodiment, barrel 30 is shaped as a hollow cylindrical tube. A barrel opening 32 located at the top of barrel 30 allows access to the interior of barrel 30.

Figure 2:
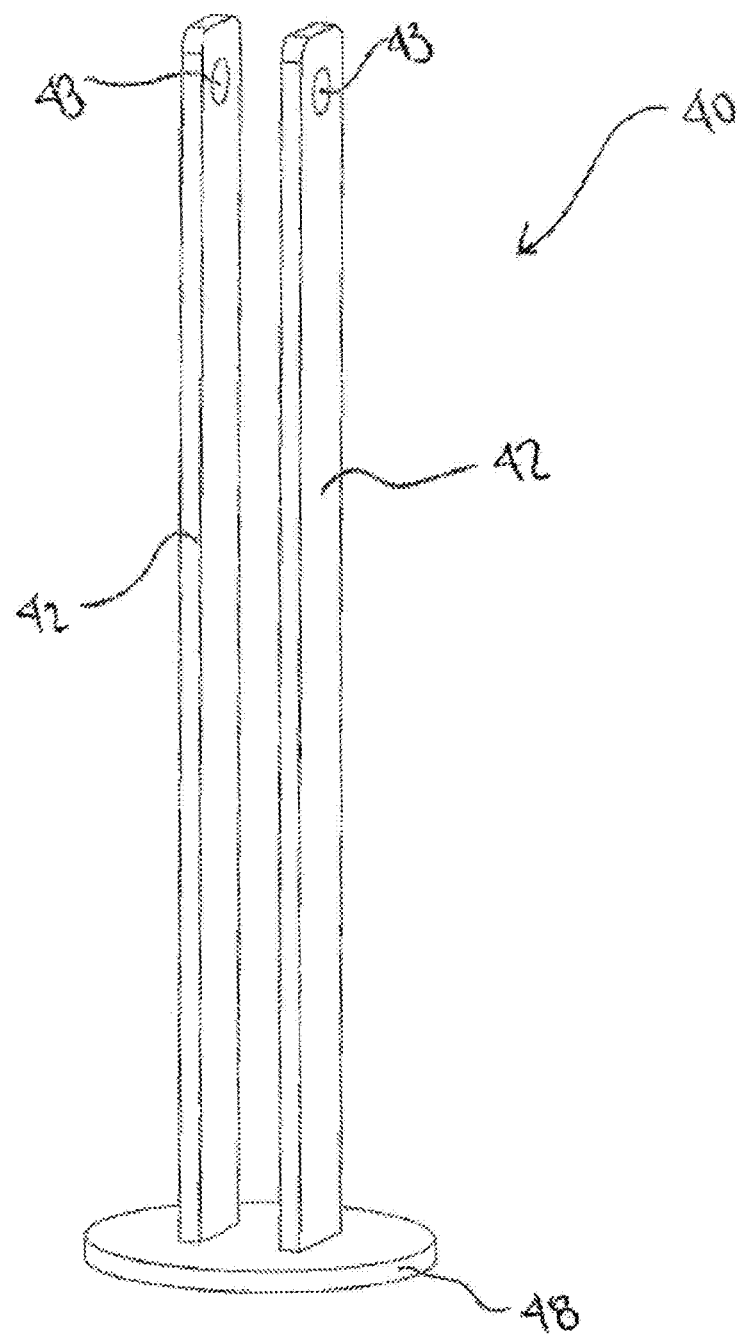
FIG. 2 is a perspective view of the piston assembly from the extrusion assembly of FIG. 1 according to exemplary embodiments of the present disclosure.

As seen in FIG. 2, piston system 40 may include a pair of piston arms 42. Arm openings 43 are positioned near the upper end of piston arms 42. Piston arms 42 may be attached to piston lever 35 using a pin 46. To attach arms 42 to lever 35, piston system 40 is positioned so that lever 35 is between pistons arms 43. Pin 46 may be disposed through one of the arm openings 43, through an opening in lever 35, and then through the second arm opening 43. A piston disk 48 may be attached to the bottom end of piston arms 42. Piston system 40 may be removed from barrel 30 by pulling upward on piston lever 35 and causing clutch system 20 to slide upward on shaft 19. If clutch system 20 is slid far enough on shaft 19, piston system 40 including the piston disk 48 may be removed from barrel 30, enabling access to barrel 30 through an upper barrel opening 32.

Figure 3:
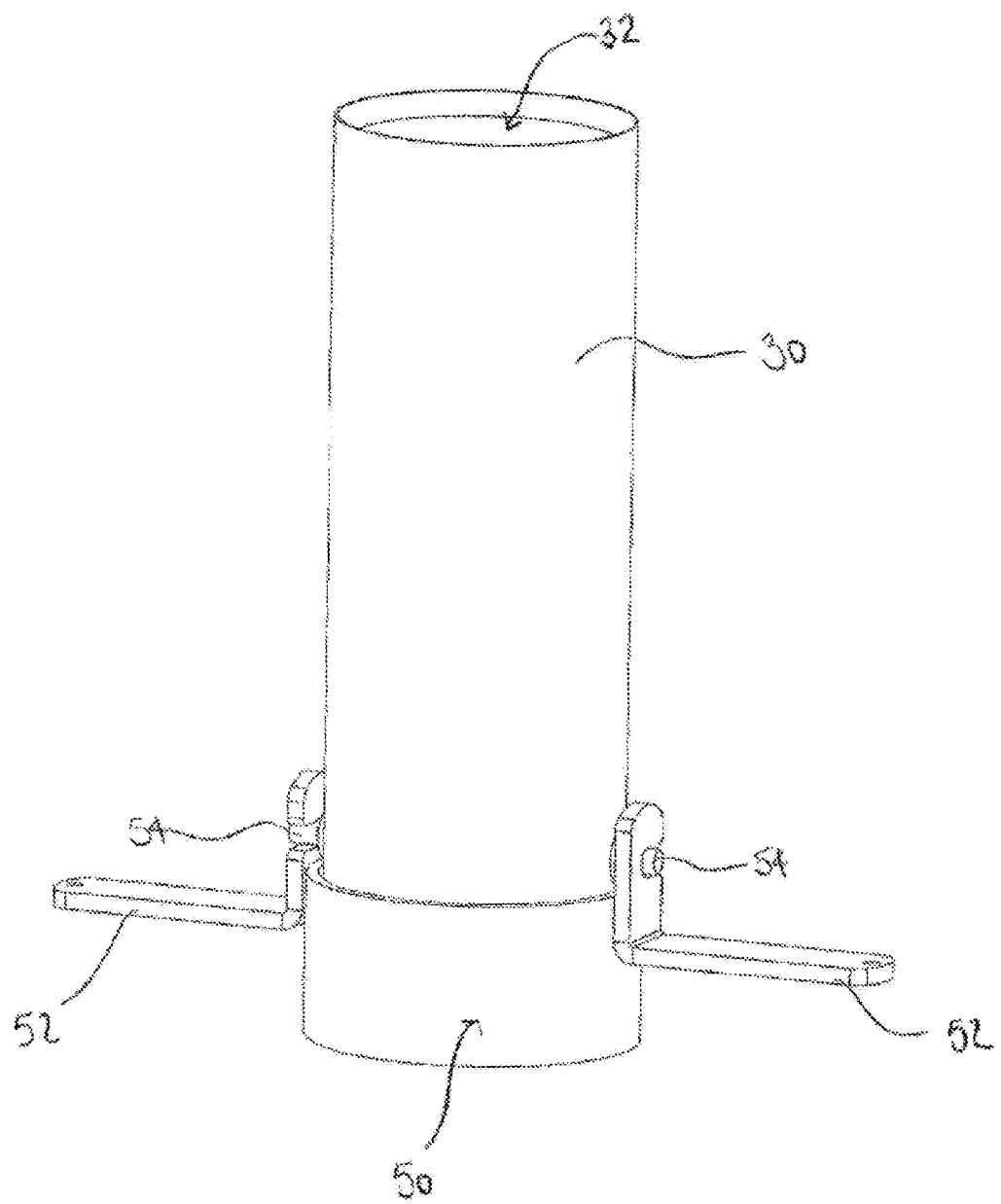
FIG. 3 is a perspective view of the barrel and base cap from the extrusion assembly of FIG. 1 according to exemplary embodiments of the present disclosure.
Figure 4:
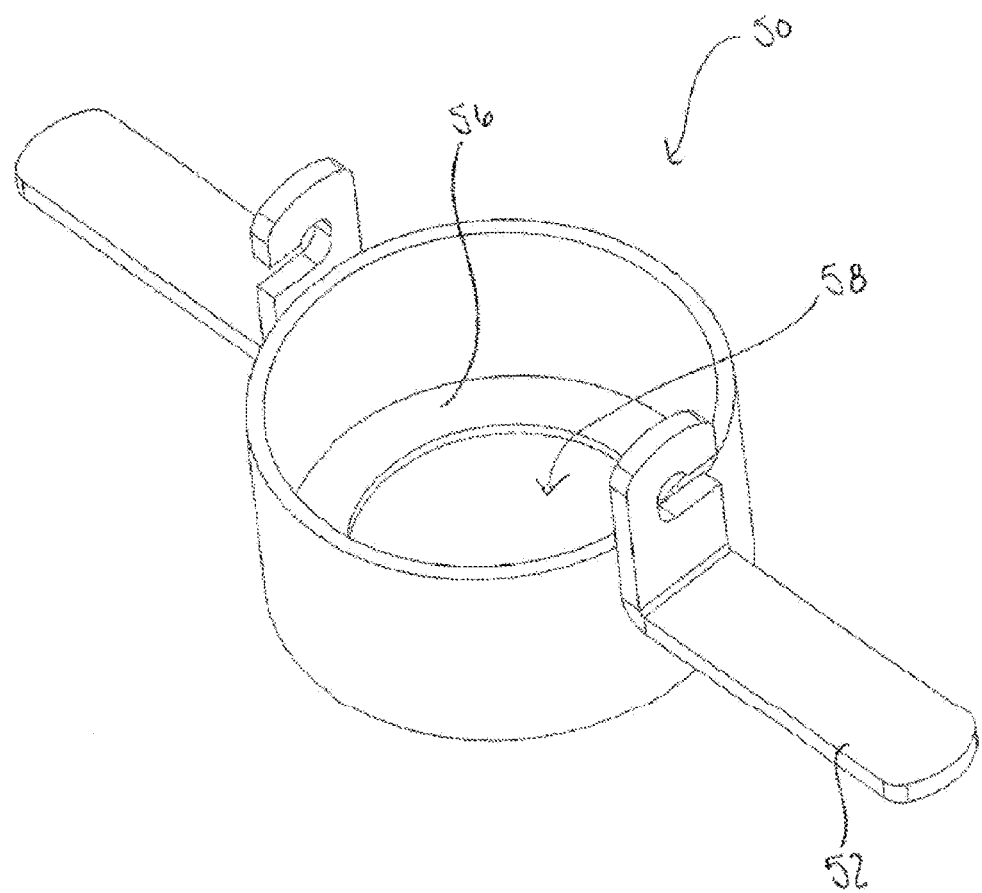
FIG. 4 is a perspective view of the base cap from the extrusion assembly of FIG. 1 according to exemplary embodiments of the present disclosure.

As shown in FIG. 3, a base cap 50 may be reversibly attached to the bottom of barrel 30. As shown in FIG. 4, the base cap 50 may include one or more base cap handles 52 positioned on opposing sides of base cap 50, which further includes notches configured to engage pins 54 located on barrel 30 (shown in FIG. 3), enabling easy installation and removal of base cap 50 from the bottom of barrel 30. An opening 58 in the bottom surface 56 of base cap 50 accepts a die (not shown) through which the extrudable material may be pushed by the piston system 40. The die may be a conventional tool die and may include at least one opening of a desired shape, depending on the desired shape and size of the extrusion. For example, the die may have an opening in the shape of a triangle to create an extrusion with a triangular cross-section or in the shape of a square to create an extrusion with a square cross-section.

Figure 5:
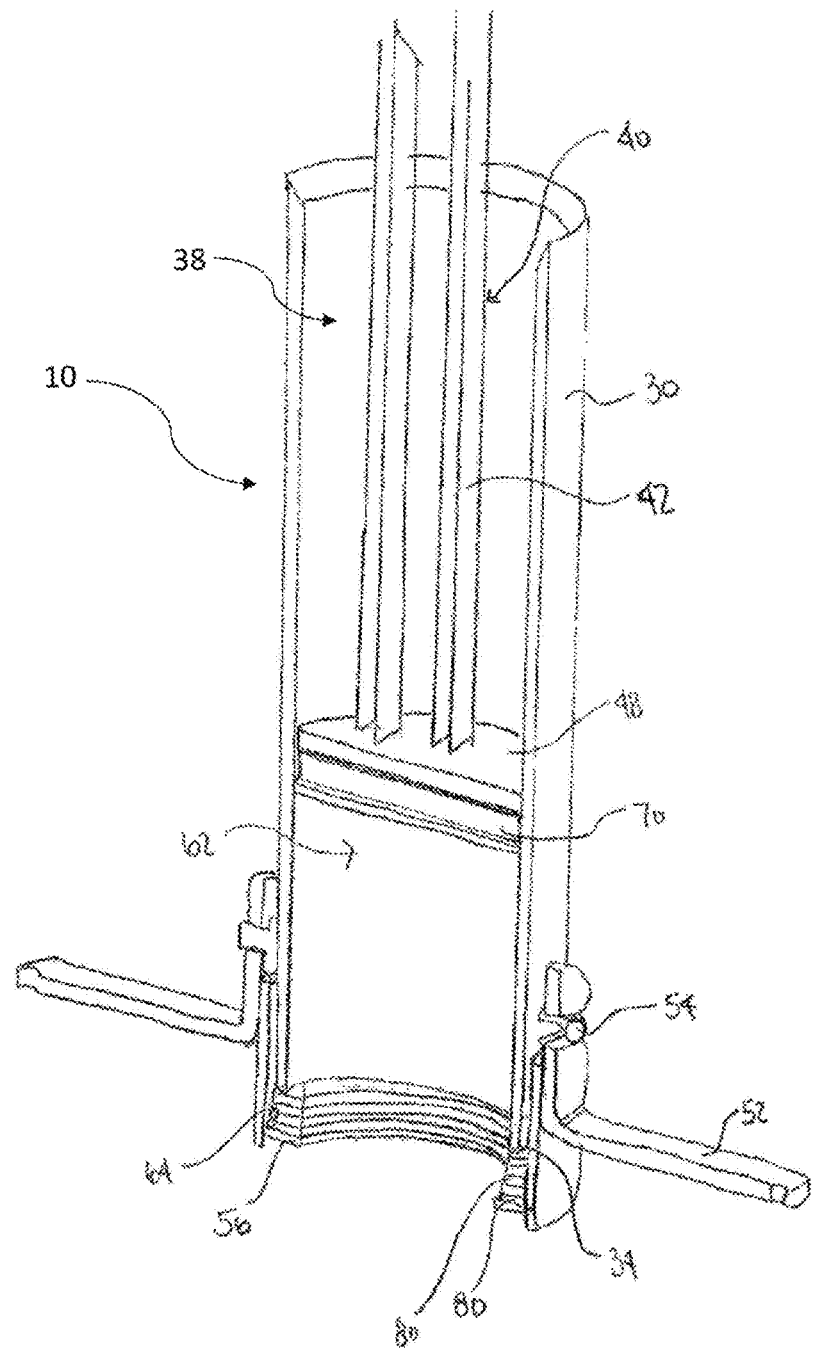
FIG. 5 is a cross-section view of the extrusion assembly from FIG. 1 according to exemplary embodiments of the present disclosure.

FIG. 5 illustrates a cross-section of extrusion assembly 10, including the piston system 40 inserted within barrel 30. As shown in FIG. 5, the barrel 30 includes an inner surface 38 defining a volume with the barrel 30. When piston system 40 is inserted into barrel 30, a variable volume 62 is created between inner surface 38, piston disk 48 and the bottom portion 56 of base cap 50. In operation, extrudable material, such as clay, is positioned in volume 62 and is pushed through base cap opening 58 as the material is forced downward by movement of piston system 40 caused by the user.

Figure 6:
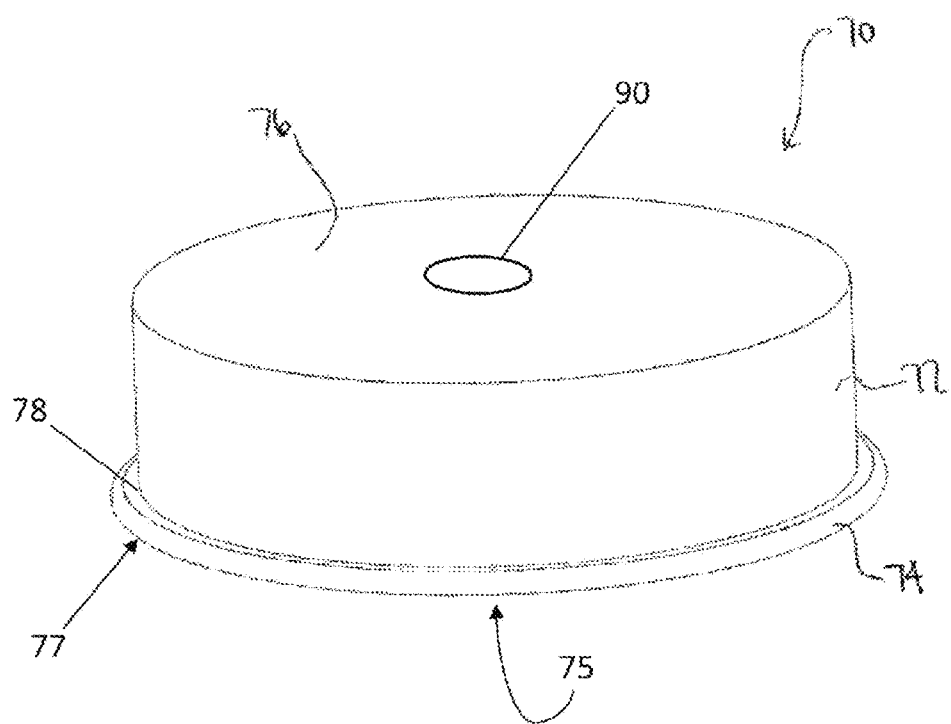
FIG. 6 is a perspective view of a barrel seal according to exemplary embodiments of the present disclosure.

In at least one embodiment according to the present disclosure, a barrel seal 70 is positioned between the extrusion material and the piston disk 48. In such an embodiment, barrel seal 70 is structured with a shape and size that is approximately equal to the internal shape and size of barrel 30. As one example, where the barrel 30 has a cylindrical shape with a circular cross-section, an embodiment of the barrel seal 70 may have a round, generally puck-shaped, profile with a diameter that is approximately equal to the inner diameter of barrel 30. In such an embodiment, as shown in FIG. 6, barrel seal 70 includes a body 72 having a top surface 76 and an axially opposing bottom surface 78. In operation, barrel seal 70 is inserted into barrel 30 so top surface 76 of barrel seal 70 contacts piston disk 48 and bottom surface 75 rests on the extrudable material residing in the volume 62. In alternative embodiments, the barrel 30 may have non-circular cross-section, and the barrel seal 70 has a complementary, non-circular, shape.

Barrel seal 70 further includes a lip 74 extending radially from the body 72 at or near the bottom surface 78. In at least one embodiment, the lip 74 may comprise a disk of larger diameter than the body 72 that is affixed to the bottom surface 78 of the body 72. The lip 74 includes a perimeter 77 having a size and shape structured to complement the inner surface 38. For example, where the barrel 30 has a cylindrical cross-section, an embodiment of the lip 74 may have diameter defined by the perimeter 77 approximately equal to or slightly smaller than the diameter of the barrel 30 defined by the inner surface 38. Lip 74 is structured to contact the inner surface 38 of barrel 30 to seal any gap that may exist or potentially develop between piston disk 48 and barrel 30. The lip 74 enables a consistent and predictable pressure and flow fluid to be created within volume 62 and the material contained therein during extrusion. The perimeter 77 of the lip 74 may include a radius to facilitate movement of the barrel seal 70 along the inner surface 38 when downward force is applied via the piston system 40. In at least one embodiment, the radius of the perimeter 77 may be about 0.063 inches (in.).

The body 72 of barrel seal 70 may be made of a semi-rigid or rigid (i.e., firm) material capable of efficiently transferring force from the piston system 40 to the extrudable material. In one embodiment, body 72 may have a diameter of around 3.8 in. and a height of about 0.875 in. In such an embodiment, the barrel seal may have an overall height, including the body 72 and the lip 74, of around 1.125 in. The lip 74 may be made from a resilient material extending radially from body 72 around its circumference. The lip 74 may further be made of a non-sticky material that does not readily stick to the extrudable material. In certain embodiments, the lip 74 and the bottom surface 75 of the body 72 may include a non-stick coating that does not readily stick to the extrudable material. In certain embodiments, the seal barrel 70 may be fabricated by co-molding the lip 74 onto the body 72 in an injection molding process.

The lip 74 may extend from the body 72 by a distance that is large enough to enable the lip 74 to flex as the barrel seal 70 is pushed along the barrel 30. The lip 74 may extend from the body 72 by a distance that is limited to prevent the lip 74 from flexing too much as the barrel seal 70 is pushed along the barrel 30 such that material may leak passed the lip 74. In certain embodiments, the lip 74 may extend between about 0.1 and 0.5 in. from the body 72. In at least one embodiment, the lip 74 may extend about 0.295 in. from the body 72. The barrel seal 70 may further include a filet 78 between the body 12 and the lip 74. The filet 78 enables the lip 74 is reversible distort and flex as described herein without causing the lip 74 to crack or fracture at the interface to the body 72. In at least one embodiment, the filet 78 may be about 0.063 in.

In one aspect, the barrel seal 70 improves the performance of a conventional extruder by preventing the extrudable material from sticking to the piston click 48 and to the inner surface 38 of the barrel 30. With a conventional extruder, as the user attempts to withdrawal the piston system 40 from the barrel 30 after extruding the desired amount of extrudable material, the piston disk 48 may become stuck to the extrudable material due to its generally tacky nature, which can make the piston system 40 very difficult to withdrawal. Moreover, material that has leaked passed the piston disk 48 may further restrict movement of the piston system 40.

In at least one embodiment according to the present disclosure as shown in FIG. 6, the barrel seal 70 may include a fastener 90 disposed on the top surface 76 of the body 72. The fastener 90 is structured to releasably attach to the piston disk 48. The fastener 90 enables the barrel seal 70 to maintain contact with the piston disk 48 of the piston system 40. In certain embodiments, the fastener 90 may maintain contact with the piston disk 48 to a desired force load and then break free, thereby releasing from the piston disk 48. Such a fastener 90 improves operation of a conventional extruder by enabling the piston system 40 to be more easily pushed into the barrel 30 as the slide clutch system 20 ratchets along shaft 19. The fastener 90 may be any suitable releasable fastener, for example a snap button. In at least one embodiment, the fastener 90 may be a magnet that magnetically attaches with limited force to the piston disk 48. In alternative embodiments, the fastener 90 may be a hook and loop fastener, such as is commonly known as Velcro™. In such embodiments, the piston disk 48 may include a mating fastener piece.

Referring to FIG. 5, in at least one embodiment according to the present disclosure, a bottom edge 34 of barrel 30 often does not extend to the bottom surface 56 of base cap 50, resulting in a bottom gap 64. The bottom gap 64 is often due to the frequent need for extruders to accommodate more advances dies, such as those using a spider, to achieve more advanced extrusions, such as hollow shapes. Such an arrangement may cause the material being extruded to be forced into the bottom gap 64 between bottom edge 34 and bottom surface 56, causing an inconsistent extrusion. The extruded material may be prevented from entering bottom gap 64 by using one or more spacer rings 80 to fill bottom gap 64 and effectively extend the barrel 30 down to the die.

Figure 7A:
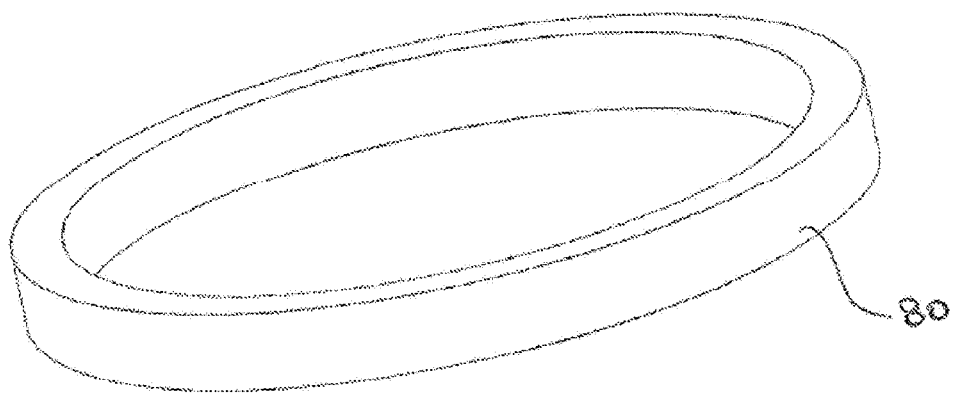
FIG. 7A is a perspective view of a ring seal according to exemplary embodiments of the present disclosure.
Figure 7B:
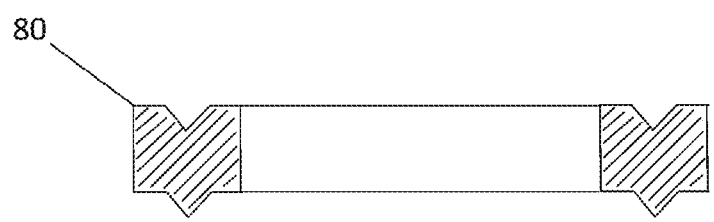
FIG. 7B is a cross-section view of a ring seal according to exemplary embodiments of the present disclosure.

As shown in FIG. 7A, spacer rings 80 are rings that may be made from a rigid or a resilient, compressible material. Spacer rings 80 may be configured to fit within the base cap 50. For example, spacer rings 80 may have the same or similar inner diameter as barrel 30 so as to fit between barrel 30 and bottom surface 56 of base cap 50. Spacer rings 80 may be held in place by the compressive force between barrel 30 and base cap 50. Multiple spacer rings 80 may be used to fill bottom gap 64 by sitting on top of one another to accommodate extruders having varying sized gaps. In certain embodiments, as shown in FIG. 7B, spacer rings 80 may have protrusions or grooves on their axial surfaces that enable multiple spacer rings 80 to be interlocked and securely stacked on each other so as not to slide relative to each other. In certain embodiments, the bottom-most spacer ring 80 adjacent the base cap 50 may include a flat side (i.e., without protrusions or grooves) adjacent the base cap 50 to facilitate sealing there-against.

Base cap 50 may be removed from barrel 30 and a different base cap 50 may be attached to provide a different size or shape extrusion. When a new base cap 50 is added, the number of spacer rings 80 may be increased or decreased to fill the gap between the bottom surface 56 of the base cap 50 and the bottom of barrel 30. In certain embodiments of the extruder assembly 10, there is no bottom gap 64 between the base cap 50 and the bottom edge 34 of barrel 30, and such an embodiment may not include any spacer rings 80.

In operation, the user selects the desired base cap 50 and die to be attached to the base of barrel 30. The combination of the opening 58 and the die in the bottom of base cap 50 determines the shape that the extruded material exiting the extruder assembly 10 once pushed through barrel 30. The user may stack spacer rings 80 on bottom surface 56 of base cap 50 to fill the bottom gap 64 created between the bottom edge 34 of barrel 30 and bottom surface 56. The number of spacer rings 80 that are stacked depends on the size of the bottom gap 64. The number of spacer rings 80 employed should entirely fill bottom gap 64 (see FIG. 5).

The piston system 40 may be initially removed from barrel 30 allowing the user access to volume 62 through upper barrel opening 32. The user inserts an extrudable material, such as clay, into the barrel 30 through upper barrel opening 32. Once the extrudable material has been placed in barrel 30, the user places the barrel seal 70 into barrel 30 such that barrel seal 70 rests on top (i.e., at the back) of the extrudable material. Barrel seal 70 is positioned so protruding edge 74 is located near the extrudable material.

Once spacer rings 80 and base cap 50 have been properly installed and the extrudable material and barrel seal 70 have been inserted into barrel 30, the user positions piston system 40 so piston disk 48 aligns with and contacts top surface 76 of barrel seal 70. The user then applies downward force on piston lever 35, causing piston system 40 to push downward on barrel seal 70 and slide through barrel 30. As piston system 40 and barrel seal 70 move through barrel 30, the extrudable material is forced through the die and extruded from opening 58 of base cap 50. While barrel seal 70 moves through barrel 30, lip 74 contacts the inner surface 38 of barrel 30 such that no gaps exist between seal 70 and barrel 30. If barrel seal 70 were not present, gaps could exist between piston disk 48 and the inner surface 38, causing some of the extrudable material to be pushed through these gaps (i.e., leak-back), which can affect the consistency of the extrusion.

The barrel seal 70, by preventing leak-back, also serves to make the extrusion process easier for the user. By preventing leak-back, the barrel seal 70 prevents material from being trapped above the piston disk 48 and between the piston disk 48 and the inner surface 38. In addition, the surface of the piston disk 48 does not contact the typically sticky surface of the extrudable material and thus can be moved up and down much more freely. In a conventional extrusion process, the piston disk 48 can become stuck, requiring great force to remove from the barrel 30.

The sealing rings 80 act to fill bottom gap 64 between the bottom edge 34 of barrel 30 and bottom surface 56 of base cap 50. Without sealing rings 80, extrudable material may be forced through bottom gap 64 and get lodged between base cap 50 and the outer surface of barrel 30. Bottom gap 64 may also affect the consistency of the extrusion, which may be undesirable for various products for which the extrusion is to be used. With sealing rings 80 in place, the extrudable material cannot enter bottom gap 64 and a more consistent extrusion is achieved.

Barrel seal 70 may also assist in cleaning extrusion assembly 10. To clean barrel 30, the user may remove the base cap 50 and any remaining extrudable material from barrel 30 and insert barrel seal 70 into barrel 30 through opening 32. Piston disk 48 is then positioned on top surface 76 of barrel seal 70, and the user pushes downward on piston lever 35 to force piston disk 48 and barrel seal 70 through barrel 30. As barrel seal 70 moves through barrel 30, lip 74 scrapes excess material from the inner surface 38 of barrel 30. Thereafter, the piston disk 48 can be easily withdrawn back through the barrel 30 (using the piston lever 35 or otherwise) because it is not in direct contact with the extrudable material; instead, the piston disk 48 releases from the barrel seal 70 and is easily pulled back up through the barrel 30 toward the barrel opening 32, whereas the barrel seal 70 remains coupled with the extrudable material and may be removed through the bottom edge 34 of the barrel 30.

The barrel seal 70 may further increase the reliability and longevity of the extrusion assembly 10. In a conventional extruder, the piston disk 48 can become bent due to the repeated force applied against an uneven extrudable material of variable hardness. The barrel seal 70 enables the piston disk 48 to consistently seat against a firm surface and uniformly distributes pressure from the piston disk 48 to the extrudable material, thereby prevent excessive unbalanced forces that can wear and damage the piston disk 48.

Now referring to FIGS. 9A-12B, the uniform distribution of pressure across the barrel seal 70 is also important in operation as it facilitates the creation of a vortex within the interior of the barrel 30 when force is applied to the first end of the body 72 of the barrel seal 70. The effect of such vortex can be visualized on the extrudable material in FIGS. 12A and 12B, which provide visual examples of the forces applied to the material being extruded through the assembly of the present disclosure in operation by virtue of the inventive designs presented herein.

Figure 9A:
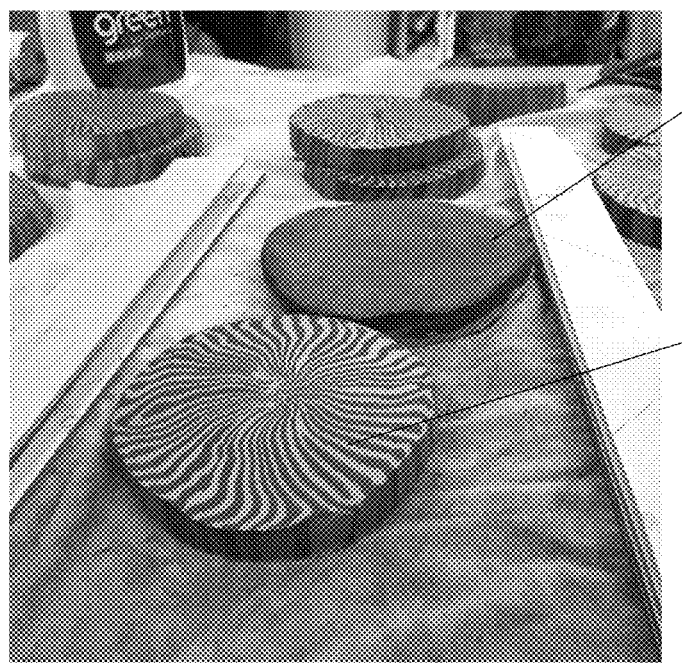
FIG. 9A shows a photograph of separated layers of an initial roll, pre-stack, with one of the layers comprising a horizontal stack of two colors and at least one of the layers comprising a radial stack of two colors.
Figure 9B:
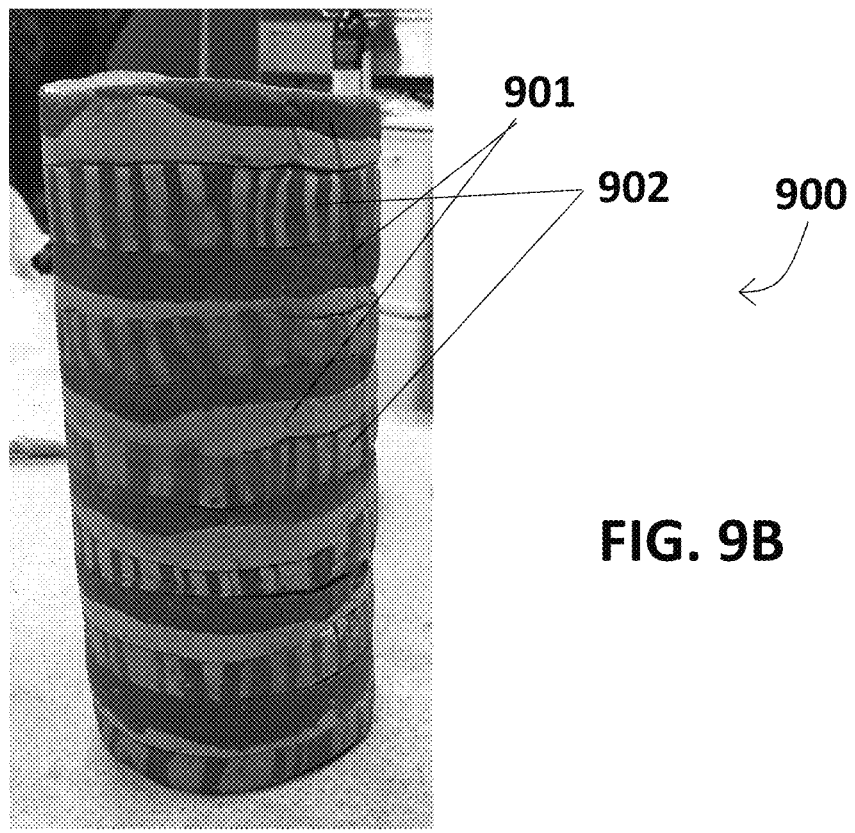
FIG. 9B shows a side view of at least one embodiment of an initial roll pattern pursuant to the present disclosure.
Figure 9C:
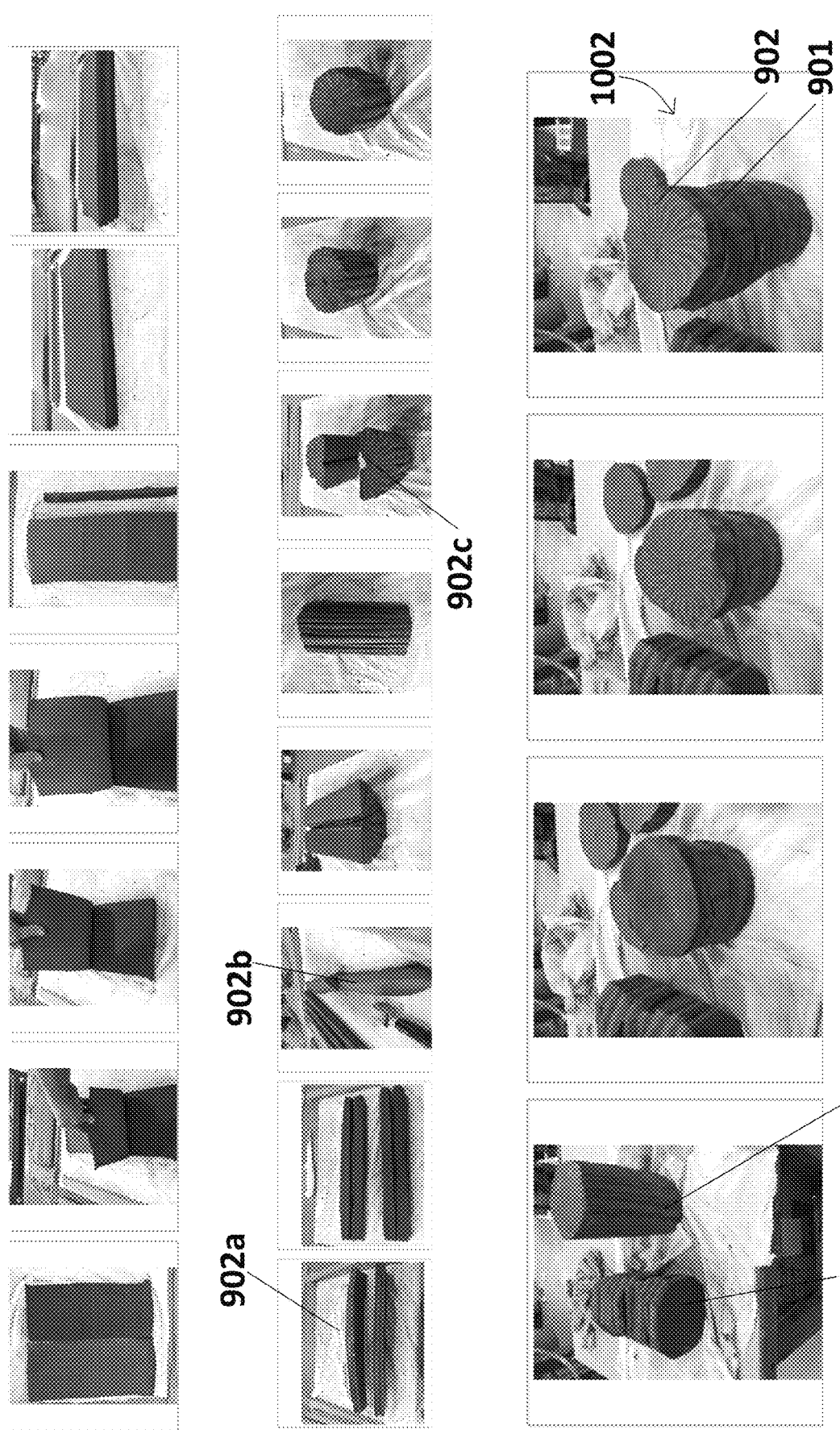
FIG. 9C shows a step-by-step diagram of the steps of preparation at least one embodiment of an initial roll for millefiori pattern extrusions.
Figure 10:
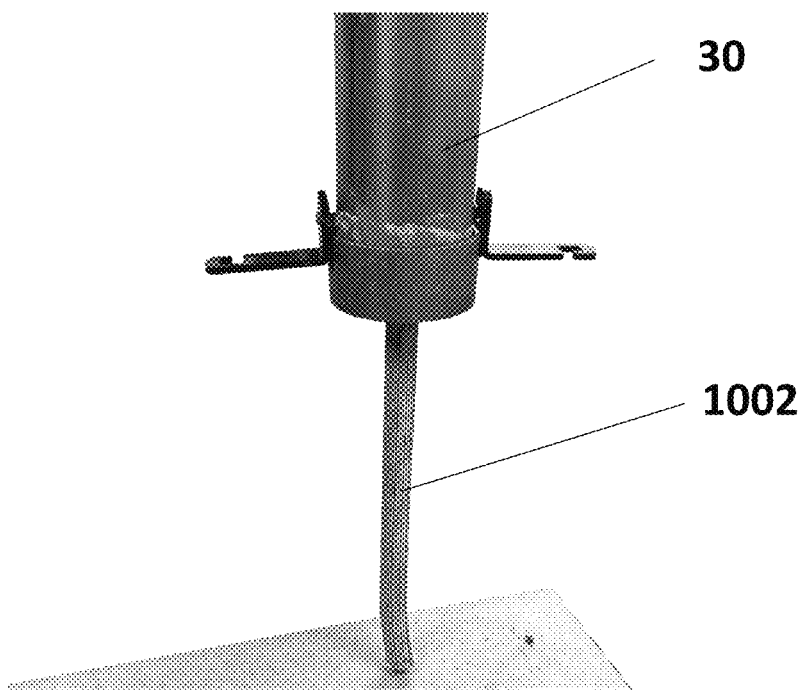
FIG. 10 shows a photograph of extruded material hanging out of a die of the assembly of the present disclosure prior to cutting.
Figure 12A:
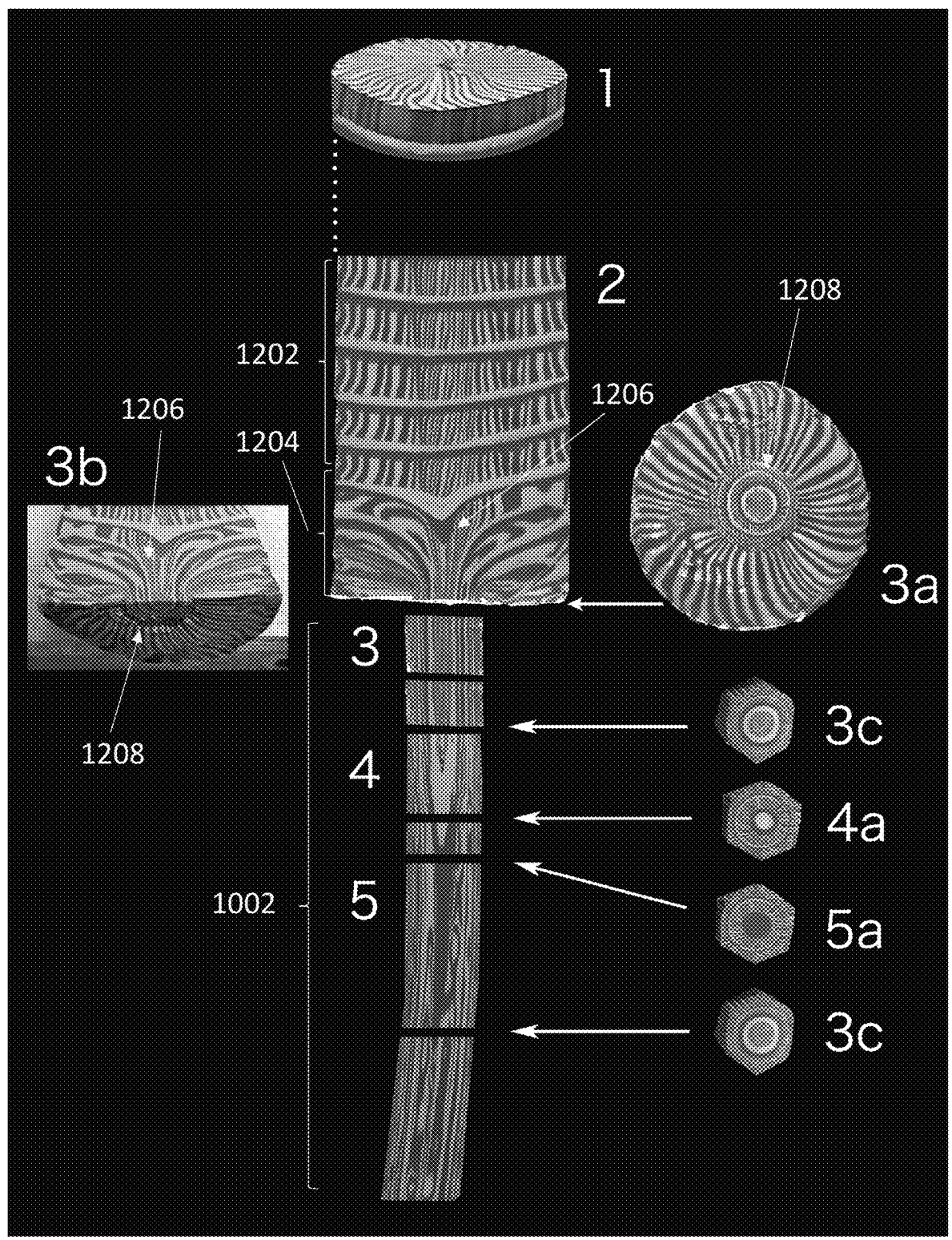
FIG. 12A shows a photograph diagram of extrudable material at various stages of extrusion using the systems and methods of the present disclosure, with portion 1 showing a perspective view of initial extrudable material prior to insertion into the extrusion barrel, portions 2, 3, 3*b*, 4, and 5 showing vertical cross sectional views of the extrudable material, and portions 3*a*, 3*c*, 4*a*, and 5*a* showing horizontal cross sectional views of the extrudable material.

More specifically, FIGS. 9A-9C show the initial material 900 and options for forming the same, FIG. 10 shows the extruded material 1002 after exiting the assembly, and FIG. 12A shows a photographic diagram of extrudable material as it is loaded into (portion 1), pushed through (portion 2), and exits (portions 3-5) the inventive extrusion assembly comprising the barrel seal 70 of the present disclosure.

Portion 1 of FIG. 12A displays a perspective view of an initial material 900 comprising extrudable material that is formed for loading into the barrel opening 32. As shown in detail in FIGS. 9A-9C and 12A, in at least one iteration of the present disclosure, the initial material 900 comprises at least one first stack layer 901 having both white and black clay arranged in a radial stack, and at least one second stack layer 902 having both white and black clay arranged in a horizontal stack. These stack layers 901, 902 may then be repeated in the initial material 900 as shown in FIG. 9B. Notably, the individual, handmade rods 800 of conventional techniques are not required (nor are the multiple rolling, compressing, and cutting steps); instead, the initial material 900 is much quicker and easier to prepare. In the embodiment shown in FIG. 9A, the initial material comprises simply layers stacked together, all having a diameter of about 103 mm (however, it will be noted that any diameter suitable to fill the barrel 30 of the system may be employed).

While the initial material 900 shown here comprises a repeating stack comprising two types of extrudable clays each having different colors and arrangements and all formed into a roll, it will be appreciated that any number of different materials may be employed to form the initial material 900 (e.g., at portion 1). The initial material 900 may also have any number of stacked layers. In at least one embodiment, for example, the initial material 900 may comprise two or more different extrudable clays and/or other materials, with each material present in each of the twelve layers. Additionally or alternatively, the initial material 900 may comprise three or more different types of extrudable clay and/or other materials, with one or more of the layers comprising a single material throughout that layer. In yet other embodiments, the initial material 900 may comprise between three and ten different materials, or ten or more materials, with each of the different layers having one or more materials arranged and/or stacked in varying patterns.

Indeed, various materials may be employed in a variety of combinations as desired including, without limitation, translucent clay (i.e. a clay that fires translucent), ceramic clay, high fire clay, low fire clay, metal clay, circuit clay, and/or any combination of the foregoing. In at least one exemplary embodiment, the materials comprise one or more types of water-based clay. Furthermore, any number of layers may be utilized as desired (with more layers, typically resulting in more yield of extruded end product and an increase in thickness of a layer resulting in an increased production of the respective pattern in the extruded material).

The initial arrangement of the various materials may also be manipulated to achieve a desired effect or pattern (complex or otherwise) in the resulting extrusion. The arrangement at portion 1 in FIG. 12A and in layers 901, 902 of FIG. 9A result in a millefiori pattern on the extruded material 1002 as is discussed in more detail below. However, one of skill in the art will appreciate that the patterns, materials, and/or stack organization may be manipulated to result in different stresses within the resulting extruded material, which can have a significant effect on the resulting shape of the extruded material once fired. Additionally, the materials may be selected with the end product type in mind; for example, and without limitation, where an acoustic tile for sound and/or speaker applications is desired, the at least one of the material(s) may be selected for vitrification such that the fired end product will muffle and/or bounce sound waves.

Additionally or alternatively, one or more porous materials may be incorporated into the initial roll where it is desirable for the extruded product to have bacterial absorbent, odor absorbent, or other absorbent properties. There, for example, the absorbent material can be incorporated into the stacks of the initial material 900 in such a manner that an outer layer of each resulting extruded product (e.g., a tile or the like) includes a liquid or odor pervious portion which allows liquid, bacteria, and/or odor to enter the tile, but prevents the absorbed material from migrating between adjacent tiles.

Still further, one or more of the materials may comprise a translucent clay or other material that results in a translucent end product. Such materials may be especially useful where a tile or other end product that allows light to pass therethrough is desired. For example, where a translucent material is incorporated into the stack pattern of the initial roll, the end product may comprise at least a portion of translucent material. Notably, with many translucent clays and other materials, the amount of light allowed to pass therethrough is precisely tunable using techniques known in the art. Accordingly, the systems and methods of the present disclosure that enable the inclusion of highly detailed and precise images on the end product may be used, in at least one embodiment, to produce tiles where at least a portion of the extruded product/tile design is translucent. When laid over a light source, such tiles are particularly useful in architecture, interior, and artistic design applications as they are not only aesthetically appealing but also functional (e.g., by providing visibility to a user up a staircase or other pathway that is visually navigated).

FIG. 9C shows a step-by-step process of the preparation of initial material 900 according to at least one embodiment of the present disclosure. This particular repeated stacking design results in a millefiori-like end product that heretofore has been only achieved using manual or by-hand techniques. Pre-layers 902a, 902b, and 902c illustrate at least one process for preparing the arrangement of a starburst stacking layer 902 (here, the starburst stacking layer 902 comprised about 20 mm). In the at least one embodiment shown in FIG. 9C, layer 901 actually comprises two layers—one comprising a first color (here, white) which was about 8 mm thick, and a second comprising a second color (here, black), which was also about 8 mm thick. To achieve a millefiori-like design, layer 901 need only have a layer comprising a single color. While 901 may comprise multiple single-color layers stacked as shown in FIGS. 9A and 9B, it is preferable that there is at least one layer having a single color throughout. Furthermore, it will be noted that the design of layer 902 may comprise any design. While a starburst pattern is shown in FIGS. 9A-9C in layer 902, layer 902 may comprise a "hotdog" pattern (similar to that of rod 800 in FIGS. 8A and 8B), a striped pattern (similar to that of layer 806 in FIG. 8E), or even a previously extruded pattern.

Referring back to FIG. 12A, portion 2 is the initial material 900 that is positioned within the volume 62 of the barrel 30, where the barrel seal 70 (not shown) is positioned at least partially within the barrel 30 (not shown) and above the extrusion material/initial material 900, and downward force is applied to the barrel seal 70 and extrusion material via the piston system 40. Notably, the barrel seal 70 comprising lip 74 enables consistent and predictable pressure and flow within the volume 62 of the extrudable material (see section 1202 where the stackable layers are substantially maintained and no extrudable material oozing behind the barrel seal 70). However, at or near the bottom edge 34 of the barrel 30, the base cap 50, a vortex is formed by virtue of the opening 58 and die in the bottom of the base cap 50 that the extrudable material is pushed through. As seen in section 1204 of FIG. 12A, this vortex causes a core region 1206 of the extrudable material in section 1204 to flow faster than a lateral portion of the extrudable material (i.e. that portion closer to the inner surface 38 of the barrel 30) adjacent thereto as the extrudable material is forced through the die. This vortex in combination with the consistent downward force and no-leak design of the barrel seal 70 and lip 74, together with the elimination of any bottom gap 62 via the sealing rings 80, allows for a consistent exit of extrudable material through the die in a very unique, intricate, clear, and consistent pattern of materials. After exiting the assembly through the die, the extruded material 1002 comprises a repeating millefiori-like or other detailed patterns within its horizontal cross-sections. Notably, these patterns are all distinct and clear which is entirely unlike any other design or clay arrangement that is conventionally achievable using conventional extruders.

Figure 12B:
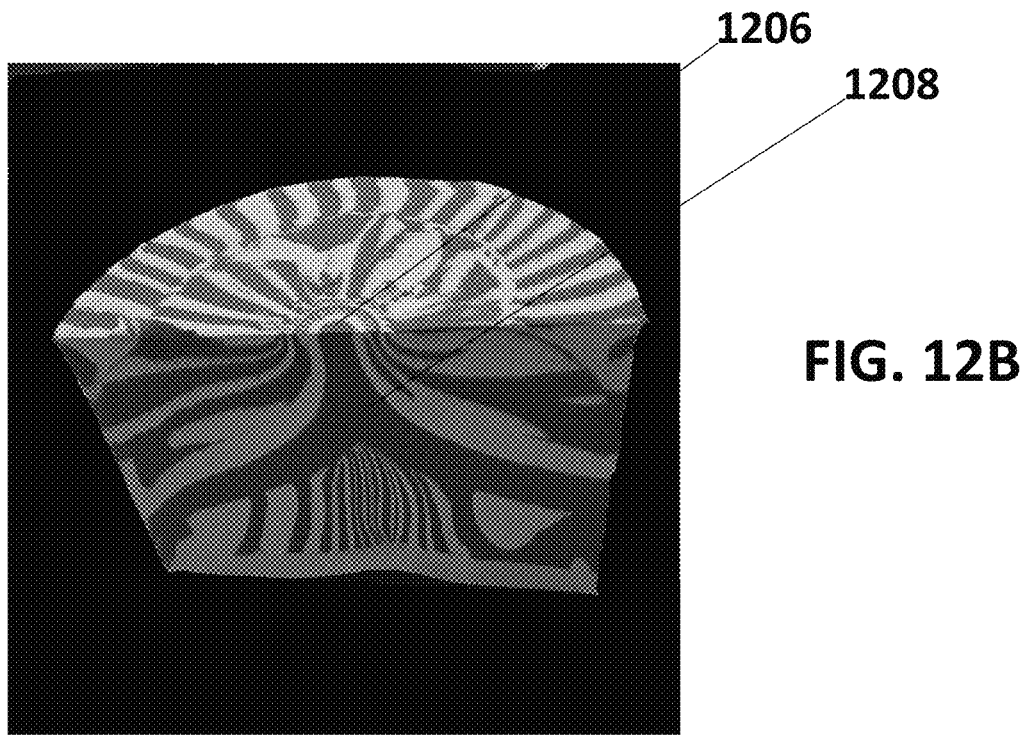
FIG. 12B shows a distal view of a cross-section of extrudable material removed from the barrel of an assembly of the present disclosure.

Portion 3a shows a cross-sectional view taken horizontally of extrudable material at a location just prior to moving through the die of the assembly, with portion 1208 clearly showing the unique design achieved by virtue of the vortex and other factors described above. Portion 3b shows an alternative double-cross-sectional view (taken both horizontally and vertically) to further illustrate the unique combination of forces achieved through this inventive system. Portion 3 was vertically cross-sectioned just after the extruded material 1002 was extruded through the die and was immediately adjacent to where the cross sections of portions 3a and 3b were taken. FIG. 12B additionally shows such a cross section of extrudable material taken at the same location, where the initial material 900 of the extrudable material was prepared using a different pattern. For the avoidance of doubt, the initial material 900/extrudable material in section 1202 does not have the intricate pattern displayed at portion 1208 (see section 1202); instead, it remains substantially identical to its initial design until the vortex pressure is combined with the consistent downward force applied by the firm surface of the barrel seal 70 against the bottom surface 56 of the base cap 50.

Figure 11:
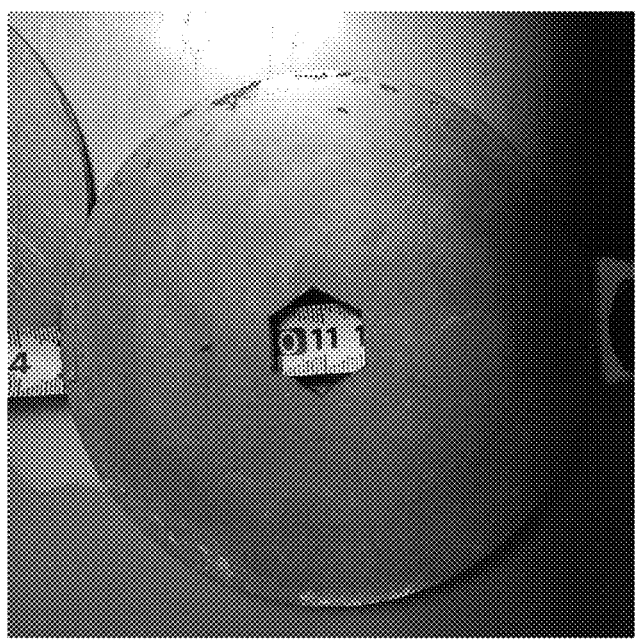
FIG. 11 shows at least one embodiment of a die for use in the assembly of the present disclosure.

Interestingly, the height of the vortex effect (i.e. section 1204), and thus the size of the resultant imaging/patterning on the extruded material, can be modified by adjusting the size of the die opening. Where a larger die opening is employed, the height of section 1204 increases relative to section 1202, whereas if a smaller die opening is used, section 1204 decreases in size and a smaller, more intricate image can be achieved in the extruded material. FIG. 11 shows at least one embodiment of such a die, where the die comprises a hexagon having about a 2 inch diameter. It will be appreciated that any other die shape and/or configuration may be employed as desired, for example, a hexagon comprising between about a 0.5 inch diameter and a 6 inch diameter (straight-side to straight-side), including without limitation a 20 mm diameter, a 22 mm diameter, a 24 mm diameter, a 1 inch diameter, a 27 mm diameter, a 1.5 inch diameter, a 2.5 in diameter, a 3 inch diameter, and the like. Additionally, where clay is utilized, a user can affect the resulting pattern by manipulating the memory of the clay. For example, the directional placement of the various layers in the initial material 900 can affect the movement of the clay within the vortex and in the resulting fired product.

Figure 13A:
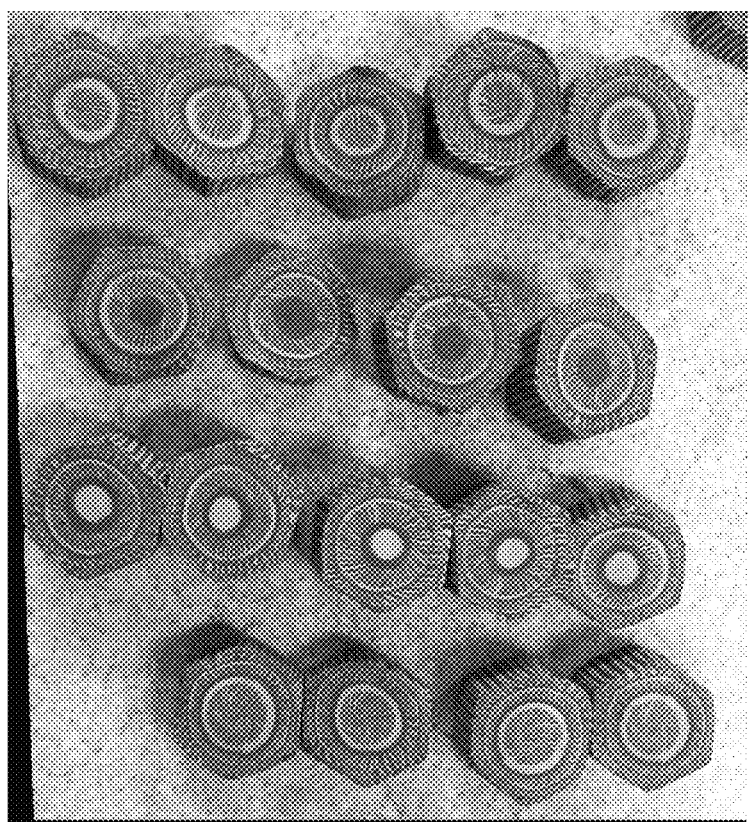
FIG. 13A shows cross-sections of material extruded resulting from initial material being extruded through an extruder system of the present disclosure, the extruded material cut into slices of about 7 mm thickness and arranged in groups of like patterns.
Figure 13B:
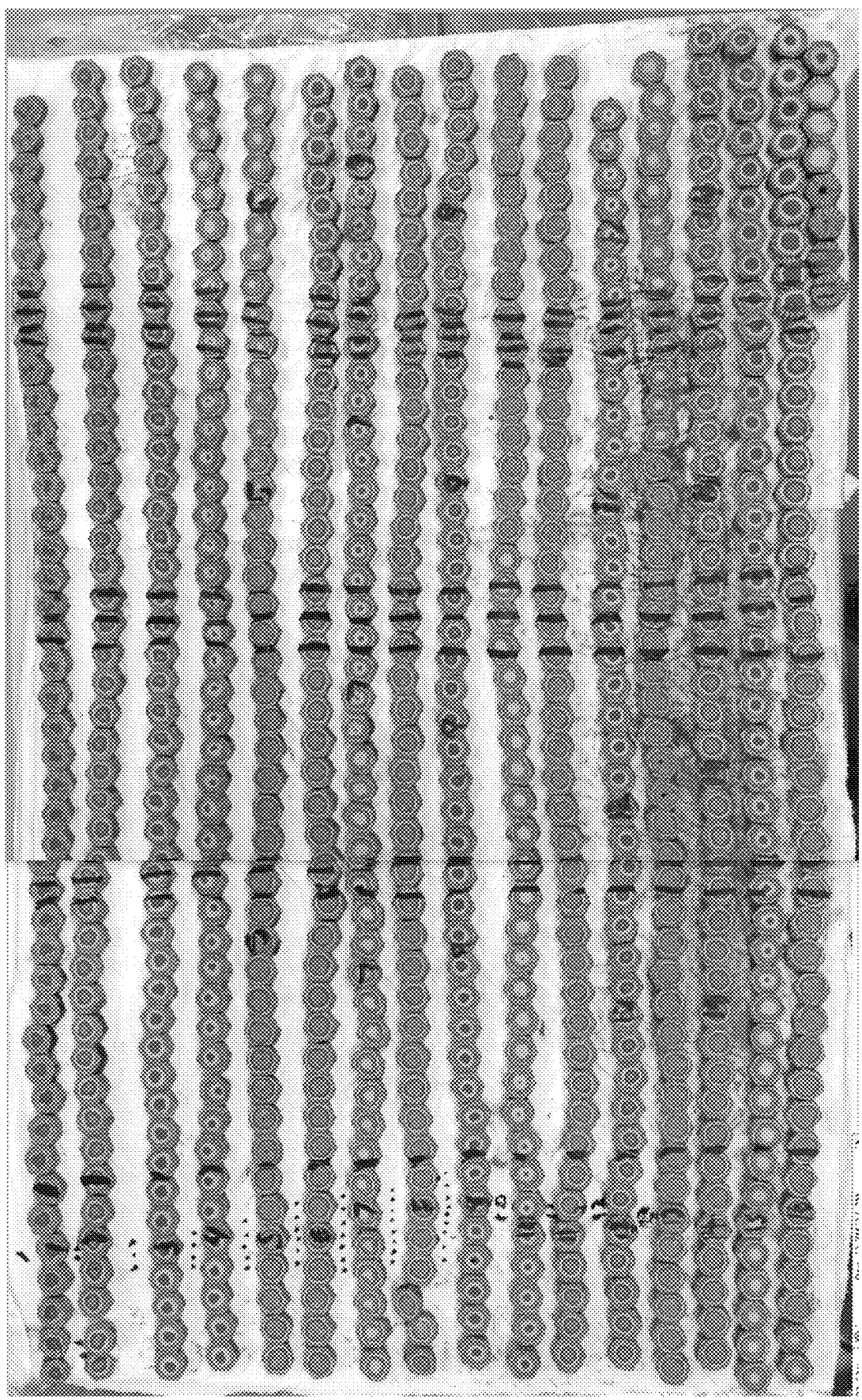
FIG. 13B shows cross-sections of material extruded through at least one embodiment of an extruder system of the present disclosure comprising a 103 mm barrel and a 20 mm die, each cross section cut at about 7 mm thickness, which illustrates the repeating patterns therein.

Referring now to horizontal cross-sections 3c, 4a, and 5a taken from portions 3, 4, and 5, respectively, the intricate pattern of the clay/materials can be seen in the resulting extruded material 1002. The progression between the patterns can be repetitive and consistent where the initial material 900 is arranged in a consistent pattern (see, e.g., the repetition of design in cross sections 3c, which resulted from the initial material's 900 repeated stack design shown in FIG. 9B). While only cross section 3c is shown repeated in the extruded material 1002 of FIG. 12A, where there is additional length of the extruded material 1002, the pattern of cross sections 4a and 5a will also repeat in the order displayed, consistently and at equal intervals, due to the pressure of the vortex created within the barrel 30. FIGS. 13A and 13B show about 7 mm thick, horizontal cross-sectional slices of material extruded using the methods and systems of the present disclosure (including a 20 mm die) and clearly illustrate the repetition of a starburst center, black center, white center pattern (FIG. 13A) and a starburst center, black center pattern (FIG. 13B) which is achieved by virtue of the vortex.

The patterns, and occurrence thereof, repeat depending on how the initial material 900 (i.e. the various materials are organized and/or stacked within the initial material 900). For example, the initial material 900 comprises a starburst 902, white (901), black (901) repeated pattern (see FIG. 9B). There, if the starburst layer 902 is thicker than the white and black layers 901, then the starburst center pattern will be the most predominant cross section in the extruded material (although, note that this may vary depending on the viscosity, colors, and/or compression characteristics of the various materials used). In the embodiments shown in FIGS. 13A and 13B, the starburst layer 902 was thicker than layer 901 in the initial material 900 and, thus, the resulting extruded material 1002 yielded 389 slices with a starburst center and 168 slices with a black center.

Figure 14:
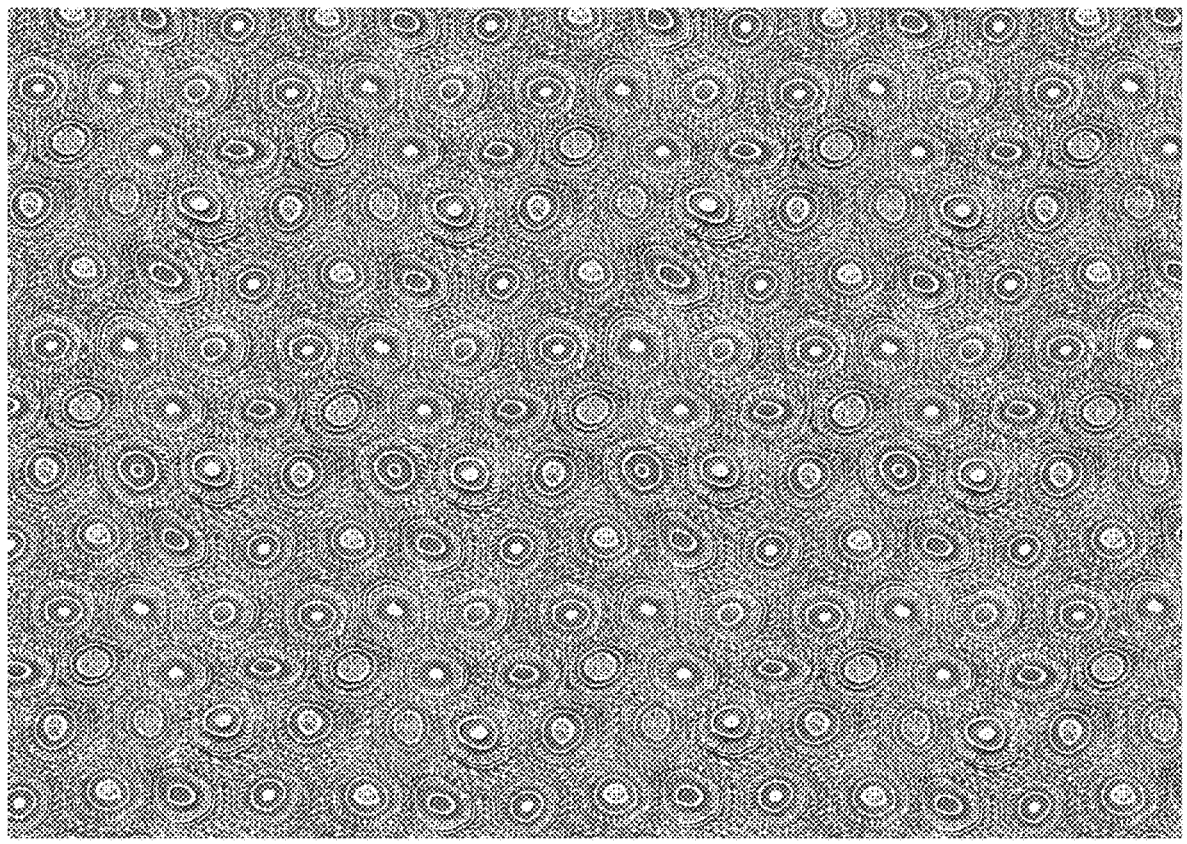
FIG. 14 shows a plurality of sliced cross-sections taken from material extruded pursuant to the methods, and using the assembly, of the present disclosure.

Thereafter, the extruded material 1002 may be sliced and the slices arranged and/or further processed as desired. For example, in at least one embodiment, the slices may comprise between about a 0.1 mm-3 cm thickness. One or more of the slices may be applied to and/or manufactured into a tile. Additionally or alternatively, one or more slices may be applied to any other type of apparatus where the millefiori-like design is desired for functional and/or aesthetic purposes. In at least one embodiment, a plurality of the slices may be arranged adjacent to and/or overlapping each other to create a sheet (see, e.g., FIG. 14). Such sheet may be further processed into pottery or other ceramics using methods commonly known in the art and/or overlaid over a mold or base material (e.g., a tile).

Still further, it may be desirable to deair and/or compress the resulting one or more slices. Such deairing and/or compression may be achieved using methods commonly known in the art including, without limitation, the application of pressure using a rolling pin or processing the slices and/or pre-cut extruded material 1002 in a deairing chamber coupled with a deairing apparatus such as a de-airing pug mill or other de-airing machine. Thereafter, the resulting produce can be finished (via firing or otherwise), applied to a mold, molded itself, or applied to a solid base material (e.g., a clay tile) or to the surface of a machine.

There are numerous commercial applications of the present technology. Primarily, millefiori-like designs can be easily and consistently produced using the extrusion systems hereof, thus providing a quicker and cost-effective mechanism to achieve such patterns and designs. For example, in at least one embodiment, an initial material comprising two or more clay types may be extruded from the die of the system to result in an extruded material comprising millefiori designs along its horizontal cross-sections. There, the extrusion material may be cut horizontally in between about 2 mm-10 mm horizontal cross sections and the resulting slices affixed to a bowl or other pottery for decorative purposes.

As previously noted, the present systems and methods may alternatively be employed to produce ceramic tile for acoustic applications. It will be appreciated by one of skill in the art that the intricate designs produced using the inventive extrusion system can be leveraged to include various sizes and/or textures out of either sound absorbing or sound refracting materials to achieve. Accordingly, the resulting extruded material may be cut into the desired shape before filing pursuant to methods known in the art. Additionally or alternatively, the systems and methods hereof can be utilized to produce ceramic materials/tiles that comprise translucent materials for architectural, design, safety and/or other purposes.

Still further, a plurality of extruders of the present disclosure may be utilized as a group to produce and cut tiles en masse. In at least one embodiment of such a system, the piston system 40 utilizes compressed air rather than hand powered piston levers 35. Additionally or alternatively, the material extruded from the plurality of extruders may be extruded into a tube using a deaired vacuum and cut for tile or as a façade to cover the surface of tiles (or other materials) to incorporate a handmade look to the end product (albeit machine produced). Still further, such systems may be coupled with a coordinated deairing chamber such that a plurality extruded canes (each being extruded from one of the extruders in the system) are inserted into a common deairing chamber such that they are compressed together and deaired in a single, unified block.

While various embodiments of the present disclosure have been described as having an illustrative design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:
1. An extruder system comprising:
   at least one extruder comprising:
      a barrel having a barrel width structured to contain and pass an extrudable material;

a piston assembly comprising a piston structured to fit at least partially within the barrel, the piston assembly configured to push the extrudable material through the barrel upon activation; and a body disposed within the barrel between the extrudable material and the piston, wherein the body comprises a first planar end and an opposing second planar end, the first planar end being substantially parallel to the second planar end, and a lip extending radially from the body at or near the second planar end to define an edge, the edge defining a first width and the lip comprising a resilient material;

wherein the body supports the lip enabling the edge of the lip to flex, the first width is nearly the same as the barrel width, and the body is releasably coupled with the piston such that the body is released from the piston when sufficient force is applied to the piston in a direction away from the body.

2. The extruder system of claim 1, the at least one extruder further comprising a fastener affixed to the first planar end at or near a centroid of the first planar end, the fastener structured to releasably attach the body to the piston and to release the body from the piston when the sufficient force is applied to the piston in the direction away from the body.

3. The extruder system of claim 1, the at least one extruder further comprising:

a cap structured to reversibly attach to an end of the barrel and to secure an extrusion die at the end; and at least one spacer ring disposed between the end of the barrel and the cap, the at least one spacer ring configured to fill a gap formed between the end of the barrel and a bottom surface of the cap;

wherein downward pressure is applied to an extrudable material positioned within the barrel, a vortex is created within the extrudable material at or near the extrusion die.

4. The extruder system of claim 3, wherein the at least one spacer ring includes opposing protrusions and grooves configured to engage one another such that multiple spacer rings are aligned when stacked one to another with the protrusion of one spacer ring engaging the groove of an adjacent spacer ring.

5. An extruder system of claim 1, wherein the at least one extruder further comprises a plurality of extruders and the piston assembly of each extruder is activated through the application of compressed air.

6. An extruder system of claim 1, wherein the piston of the piston assembly is coupled with a lever and the piston assembly is activated through application of force to the lever.

7. A method of extruding material comprising:

providing at least one extruder system, wherein the extruder system comprises:

a barrel having a barrel width structured to contain and pass an extrudable material;

a piston assembly comprising a piston structured to fit at least partially within the barrel, the piston assembly configured to push the extrudable material through the barrel upon activation; and a body disposed within the barrel between the extrudable material and the piston, wherein the body comprises a first planar end and an opposing second planar end, the first planar end being substantially parallel to the second planar end, and a lip extending radially from the body at or near the second planar end to define an edge, the edge defining a first width and the lip comprising a resilient material;

wherein the body supports the lip enabling the edge of the lip to flex, the first width is nearly the same as the barrel width, and the body is releasably coupled with the piston such that the body is released from the piston when sufficient force is applied to the piston in a direction away from the body; and a cap structured to reversibly attach to an end of the barrel and to secure an extrusion die at the end;

placing the material in a feed end of the barrel of the extruder;

placing the body in the feed end of the barrel adjacent the material such that the body is behind the material relative to the extrusion end;

applying a force to the first planar end of the body to extrude the material from the end of the barrel through the die; and creating a vortex within a core region of the material within the barrel.

8. The method of claim 7, wherein the material comprises at least a first layer and a second layer stacked together, the first layer comprising at least a first material arranged in a first configuration and the second layer comprising at least a second material arranged in a second configuration.

9. The method of claim 8, wherein the method further comprises the step of preparing the material.

10. The method of claim 8, wherein the first layer comprises a first clay having a first color and a second clay having a second color and the first configuration comprises a patterned configuration.

11. The method of claim 10, wherein the second layer comprises the first clay and the second clay, the second configuration comprises the first clay layered over the second clay, and wherein one or both of the first clay and the second clay comprise a unitary color.

12. The method of claim 8, wherein the material comprises a plurality of first and second layers, each stacked together in a repeating pattern.

13. The method of claim 7, further comprising the steps of cutting the extruded material into segments and (a) firing the segments; (b) de-airing the segments; (c) compressing the segments; or (d) two or more of (a), (b), and (c).

14. A method of producing a tile having a pattern made by an extruder system comprising:

providing the extruder, wherein the extruder system comprises:

a barrel having a barrel width structured to contain and pass an extrudable material;

a piston assembly comprising a piston structured to fit at least partially within the barrel, the piston assembly configured to push the extrudable material through the barrel upon activation; and a body disposed within the barrel between the extrudable material and the piston, wherein the body comprises a first planar end and an opposing second planar end, the first planar end being substantially parallel to the second planar end, and a lip extending radially from the body at or near the second planar end to define an edge, the edge defining a first width and the lip comprising a resilient material;

wherein the body supports the lip enabling the edge of the lip to flex, the first width is nearly the same as the barrel width, and the body is releasably coupled with the piston such that the body is released from the piston when sufficient force is applied to the piston in a direction away from the body;

placing a first stacked arrangement of material in a feed end of the barrel of the extruder, the first stacked arrangement comprising at least two materials positioned together in a stacked arrangement;

placing the body in the feed end of the barrel adjacent to the first stacked arrangement of material such that the body is behind the first stacked arrangement of material relative to the extrusion end;

applying a force to the planar end of the body to extrude the first stacked arrangement of material from the extrusion end of the barrel through the die; and creating a vortex within a core region of the first stacked arrangement of material within the barrel, the vortex rearranging the first stacked arrangement of material into a pattern in the core region;

extruding the first stacked arrangement through a die in the extrusion end of the device to result in a molded body; and firing the molded body to produce the tile, wherein at least one of the at least two materials defines a central pattern on the tile.

15. The method of claim 14, wherein at least one of the at least two materials comprises ceramic clay, translucent clay, or both.

16. The method of claim 14, wherein the pattern comprises a millefiori pattern or other extruded imaging pattern achieved using sequencing of at least the first stacked arrangement.

* * * * *